United States Patent
Lee et al.

(10) Patent No.: US 9,800,877 B2
(45) Date of Patent: *Oct. 24, 2017

(54) METHOD AND APPARATUS FOR VIDEO ENCODING FOR EACH SPATIAL SUB-AREA, AND METHOD AND APPARATUS FOR VIDEO DECODING FOR EACH SPATIAL SUB-AREA

(71) Applicant: SAMSUNG ELECTRONICS CO., LTD., Suwon-si (KR)

(72) Inventors: Tammy Lee, Seoul (KR); Byeong-doo Choi, Siheung-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 265 days.

This patent is subject to a terminal disclaimer.

(21) Appl. No.: 14/809,765

(22) Filed: Jul. 27, 2015

(65) Prior Publication Data

US 2015/0334404 A1 Nov. 19, 2015

Related U.S. Application Data

(63) Continuation of application No. 14/375,649, filed as application No. PCT/KR2013/000754 on Jan. 30, 2013, now Pat. No. 9,571,845.

(Continued)

(51) Int. Cl.
*H04N 19/46* (2014.01)
*H04N 19/70* (2014.01)
(Continued)

(52) U.S. Cl.
CPC ......... *H04N 19/198* (2014.11); *H04N 19/119* (2014.11); *H04N 19/13* (2014.11);
(Continued)

(58) Field of Classification Search
CPC .... H04N 19/198; H04N 19/188; H04N 19/70; H04N 19/119; H04N 19/13; H04N 19/46;
(Continued)

(56) References Cited

U.S. PATENT DOCUMENTS 5,815,209 A 9/1998 Kondo et al.
7,483,581 B2 1/2009 Raveendran et al.
(Continued)

FOREIGN PATENT DOCUMENTS

CA 2 860 840 A1 7/2013
CN 101150719 A 3/2008
(Continued)

OTHER PUBLICATIONS

Communication dated Dec. 7, 2015 issued by Korean Intellectual Property Office in counterpart Korean Patent Application No. 10-2015-0104343.

(Continued)

*Primary Examiner* — Sath V Perungavoor
*Assistant Examiner* — Howard D Brown, Jr.
(74) *Attorney, Agent, or Firm* — Sughrue Mion, PLLC

(57) ABSTRACT

Provided are a video encoding method and a video decoding method according to spatial subdivisions based on splitting a picture into a first tile and a second tile, and splitting a current tile among the first tile and the second tile into at least one slice segment, encoding the first tile and the second tile, independently from each other, and encoding maximum coding units of a current slice segment among the at least one slice segment included in the current tile, with respect to the at least one slice segment included in the current tile.

4 Claims, 24 Drawing Sheets

Related U.S. Application Data

(60) Provisional application No. 61/592,572, filed on Jan. 30, 2012.

(51) Int. Cl.
*H04N 19/196* (2014.01)
*H04N 19/169* (2014.01)
*H04N 19/174* (2014.01)
*H04N 19/119* (2014.01)
*H04N 19/13* (2014.01)

(52) U.S. Cl.
CPC ......... *H04N 19/174* (2014.11); *H04N 19/188* (2014.11); *H04N 19/46* (2014.11); *H04N 19/70* (2014.11)

(58) Field of Classification Search
CPC .... H04N 19/174; H04N 7/26244; H04N 7/30; H04N 7/50; H04N 7/26085; H04N 7/26106
See application file for complete search history.

(56) References Cited

U.S. PATENT DOCUMENTS

| | | | |
|---|---|---|---|
| 7,613,345 B2 | 11/2009 | Kajiwara et al. | |
| 2007/0094478 A1 | 4/2007 | Plondke et al. | |
| 2010/0153574 A1 | 6/2010 | Lee et al. | |
| 2010/0158401 A1* | 6/2010 | Shiraishi | G06K 9/00228 382/243 |
| 2010/0225655 A1* | 9/2010 | Tung | G06T 1/20 345/522 |
| 2011/0243219 A1 | 10/2011 | Hong et al. | |
| 2011/0243244 A1 | 10/2011 | Min et al. | |
| 2012/0114034 A1* | 5/2012 | Huang | H04N 19/70 375/240.03 |
| 2013/0101035 A1* | 4/2013 | Wang | H04N 19/70 375/240.12 |
| 2013/0107973 A1* | 5/2013 | Wang | H04N 19/70 375/240.29 |
| 2013/0148739 A1 | 6/2013 | Lee et al. | |
| 2013/0202051 A1* | 8/2013 | Zhou | H04N 19/436 375/240.26 |
| 2016/0227234 A1 | 8/2016 | Han et al. | |

FOREIGN PATENT DOCUMENTS

| | | |
|---|---|---|
| JP | 7-298263 A | 11/1995 |
| JP | 2010-62871 A | 3/2010 |
| KR | 10-2006-0103409 A | 9/2006 |
| KR | 10-2011-0044486 A | 4/2011 |
| KR | 10-2011-0112178 A | 10/2011 |
| KR | 10-2012-0017010 A | 2/2012 |
| TW | 200732912 A | 9/2007 |
| TW | 201143447 A1 | 12/2011 |

OTHER PUBLICATIONS

Communication dated Dec. 7, 2015 issued by Korean Intellectual Property Office in counterpart Korean Patent Application No. 10-2015-0104344.
Communication dated Dec. 8, 2015 issued by Korean Intellectual Property Office in counterpart Korean Patent Application No. 10-2015-0104345.
Communication dated Dec. 7, 2015 issued by Korean Intellectual Property Office in counterpart Korean Patent Application No. 10-2015-0104346.
McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Apr. 15-23, 2010, 40 pages total, 1st Meeting, Dresden, DE, JCTVC-A124.
Communication dated Mar. 30, 2016 issued by Taiwanese Intellectual Property Office in counterpart Taiwanese Application No. 104124242.
Communication dated Mar. 30, 2016 issued by Taiwanese Intellectual Property Office in counterpart Taiwanese Application No. 104124224.
Communication dated Mar. 30, 2016 issued by Taiwanese Intellectual Property Office in counterpart Taiwanese Application No. 104124205.
Communication dated Jun. 6, 2016 issued by Taiwanese Intellectual Property Office in counterpart Taiwanese Application No. 102103539.
Communication dated Jun. 6, 2016 issued by Taiwanese Intellectual Property Office in counterpart Taiwanese Application No. 104124216.
Communication dated May 9, 2016 issued by Canadian Intellectual Property Office in counterpart Canadian Application No. 2,868,723.
Horowitz et al., "Tiles", Joint Collaborative Team on Video Coding (JCT-VC) of ITU-T SG16 WP3 and ISO/IEC JTC1/SC29/WG11, Mar. 16-23, 2011, 14 pages total, 5th Meeting, Cisco Systems eBrisk Video and Texas Instruments, Geneva, CH, JCTVC-E408_r1.
Zhou et al., "AHG9: on number of tiles constraint", Joint Collaborative Team on Video Coding (JCT-VC) of ITU-T SG16 WP3 and ISO/IEC JTC1/SC29/WG11, Oct. 10-19, 2012, 2 pages total, 11th Meeting, Texas Instruments Inc., Shanghai, CH, JCTVC-K0202.
Wiegand et al., "Suggested design of initial software model for scalable HEVC extension proposal by Fraunhofer HHI Vidyo and Samsung", Joint Collaborative Team on Video Coding (JCT-VC) of ITU-T SG16 WP3 and ISO/IEC JTC1/SC29/WG11, Oct. 10-19, 2012, 22 pages total, 11th Meeting, Fraunhofer HHI Samsung Electronics Co. Ltd. and Vidyo Inc., Shanghai, CN, JCTVC-K0345r3.
Sullivan et al., "Miscellaneous cleanup remarks for HEVC version 1", Joint Collaborative Team on Video Coding (JCT-VC) of ITU-T SG 16 WP3 and ISO/IEC JTC 1/SC 29/WG 11, Jan. 14-23, 2013, 3 pages total, 12th Meeting, Microsoft, Geneva, CH, JCTVC-L0363.
Communication dated Jul. 29, 2016 issued by the Korean Intellectual Property Office in counterpart Korean Patent Application No. 10-2015-0104343.
Communication dated Jul. 29, 2016 issued by the Korean Intellectual Property Office in counterpart Korean Patent Application No. 10-2015-0104346.
Communication dated Sep. 29, 2016 issued by the Taiwanese Patent Office in counterpart Taiwanese Patent Application No. 104124242.
Communication dated Sep. 29, 2016 issued by the Taiwanese Patent Office in counterpart Taiwanese Patent Application No. 104124224.
Communication dated Sep. 29, 2016 issued by the Taiwanese Patent Office in counterpart Taiwanese Patent Application No. 104124205.
Communication dated Feb. 7, 2017 issued by the State Intellectual Property of P.R. China in counterpart Application No. 201380018660.6.
Communication dated May 30, 2013 issued by the International Searching Authority in counterpart International Application No. PCT/KR2013/000754.
Chih-Wei Hsu et al., "AHG4: Low latency CABAC initialization for dependent tiles", Mediatek, 7th JCT-VC Meeting in Geneva, Nov. 21-30, 2011, JCTVC-G197, 7 pgs. total.
Communication dated Oct. 14, 2016 issued by the Canadian Intellectual Property Office in counterpart Canadian Patent Application No. 2,898,152.

\* cited by examiner

```
slice_segment_header( ) {
    first_slice_segment_in_pic_flag
    . . .
    if( !first_slice_segment_in_pic_flag ) {
        . . .
        dependent_slice_segment_flag
        . . .
    }
    . . .
}
```

CODING UNIT (1010)

PREDICTION UNIT (1060)

METHOD AND APPARATUS FOR VIDEO ENCODING FOR EACH SPATIAL SUB-AREA, AND METHOD AND APPARATUS FOR VIDEO DECODING FOR EACH SPATIAL SUB-AREA

CROSS-REFERENCE TO RELATED PATENT APPLICATION

The present application is a continuation application of U.S. application Ser. No. 14/375,649, filed on Jul. 30, 2014, in the U.S. Patent and Trademark Office, which is a national stage application under 35 U.S.C. §371 of International Application No. PCT/KR2013/00754, filed on Jan. 30, 2013, and claims the benefit of U.S. Provisional Application No. 61/592,572, filed on Jan. 30, 2012, in the U.S. Patent and Trademark Office, the disclosures of which are incorporated herein by reference in their entireties.

BACKGROUND

1. Field

Methods and apparatuses consistent with exemplary embodiments of the present application relate to encoding and decoding video according to spatial subdivisions.

2. Description of Related Art

As hardware for reproducing and storing high resolution or high quality video content is being developed, there is an increasing need for a video codec for effectively encoding or decoding the high resolution or high quality video content. According to conventional video codecs, a video is encoded according to a limited encoding method based on a macroblock having a predetermined size.

Image data of a spatial domain is transformed into coefficients of a frequency domain via a frequency transformation. According to a video codec, an image is split into blocks having a predetermined size, a discrete cosine transformation (DCT) is performed for each respective block, and frequency coefficients are encoded in block units, for rapid calculation of a frequency transformation. Compared with image data of a spatial region, coefficients of a frequency region are easily compressed. In particular, because an image pixel value of a spatial region is expressed according to a prediction error via inter prediction or intra prediction of a video codec, when a frequency transformation is performed on the prediction error, a large amount of data may be transformed to values of zero. According to a video codec, an amount of data may be reduced by replacing data that is consecutively and repeatedly generated with small-sized data.

In particular, the data size of high definition or high image quality video content increases, and accordingly, a need to process video after spatially dividing the video is increasing.

SUMMARY

According to an aspect an exemplary embodiment, there is provided a method of encoding video by spatial subdivisions, the method including: splitting a picture into a first tile and a second tile, and splitting a current tile among the first tile and the second tile into at least one slice segment; encoding the first tile and the second tile, the first tile and the second tile independently encoded from each other; and encoding maximum coding units of a current slice segment among the at least one slice segment included in the current tile, with respect to the at least one slice segment included in the current tile.

According to aspects of the exemplary embodiments, a relationship between a tile, a slice segment, and a slice is clearly defined so that an accessibility of maximum coding units to a reference object at boundaries between tiles, boundaries between slice segments, and boundaries between slices may be clearly regulated.

Also, because information representing whether a current slice segment is an initial slice segment of a picture is included in a slice segment header and information representing whether the current slice segment is a dependent slice segment is not included in the slice segment header when the slice segment is the initial slice segment, a transmission bit amount for transmitting header information may be reduced and an unnecessary parsing operation for parsing header information may be skipped.

DETAILED DESCRIPTION OF EXEMPLARY EMBODIMENTS

Hereinafter, video encoding and decoding methods according to exemplary embodiments using spatial subdivisions will be described with reference to FIGS. 1A through 7. Also, a video encoding method and a video decoding apparatus using a quantization parameter determination method based on coding units having a tree structure according to exemplary embodiments will be described with reference to FIGS. 8 through 20. In addition, various exemplary embodiments to which the video encoding and decoding methods the exemplary embodiment may be applied will be described with reference to FIGS. 21 through 27. Hereinafter, the term 'image' may refer to a still image or a moving picture, that is, video.

First, referring to FIGS. 1A through 7, a video encoding method using spatial subdivisions and a video decoding method using spatial subdivisions according to an exemplary embodiment will be described.

Figure 1A:
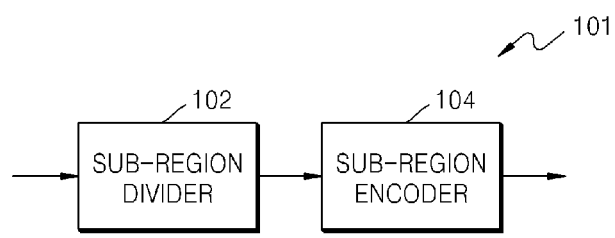
FIG. 1A is a block diagram of a video encoding apparatus encoding by spatial subdivisions, according to an exemplary embodiment.
Figure 1B:
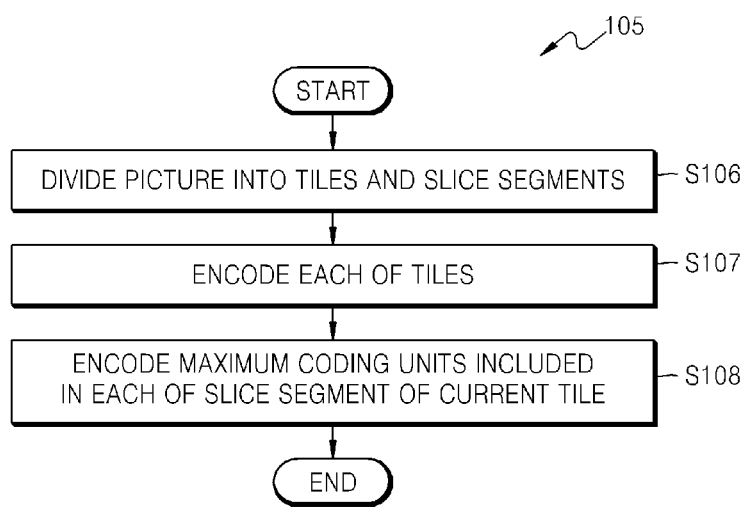
FIG. 1B is a flowchart illustrating a video encoding method executed by the video encoding apparatus of FIG. 1A.

FIG. 1A is a block diagram of a video encoding apparatus 101 encoding by spatial subdivisions, according to an exemplary embodiment. FIG. 1B is a flowchart illustrating a video encoding method (105) executed by the video encoding apparatus 101 of FIG. 1A.

The video encoding apparatus 101 according to the present exemplary embodiment includes a sub-region divider 102 and a sub-region encoder 104.

In operation S106, the sub-region divider 102 the exemplary embodiment may divide a picture into two or more tiles and at least one slice segment.

In operation S107, the sub-region encoder 104 the exemplary embodiment independently encodes each tile, and may encode each slice segment.

The video encoding processes of the present exemplary embodiment may be classified as a source encoding process, in which overlapping data due to temporal and spatial similarity of image data is minimized, and an entropy encoding process, in which redundancy is minimized in a bitstring of data generated through the source encoding process. The sub-region encoder 104 present exemplary embodiment performs source encoding on each of the pictures constituting the video by block units to generate encoding symbols. The source encoding process includes intra prediction, inter prediction, transformation, and quantization for video data of a spatial domain by block units. As a result of the source encoding process, the coding symbols may be generated in each of the blocks. For example, the coding symbols may be quantized transformation coefficients of residual components, motion vectors, intra mode type, inter mode type, and quantization parameters.

The entropy encoding of the present exemplary embodiment may be classified into a binarization process for transforming symbols into bit strings, and an arithmetic coding process performing an arithmetic coding on bit strings based on a context. Context-based adaptive binary arithmetic coding (CABAC) is widely used as an arithmetic encoding method based on a context for symbol encoding. According to the context-based arithmetic encoding/decoding, each bit of a symbol bit string may be a bin of a context, and a location of each bit may be mapped to a bin index. A length of the bit string, that is, a length of the bin, may vary according to a size of a symbol value. Context modeling for determining a context of a symbol is required to perform the context-based arithmetic encoding/decoding.

The context is renewed according to locations of bits of the symbol bit string, that is, in each bin index, to perform the context modeling, and thus a complicated operation process is required. Here, the context modeling is a process of analyzing a probability of generating 0 or 1 in each of the bins. A process of updating the context by reflecting a result of analyzing the probability of symbols by bit units in new blocks to the context so far may be repeatedly performed for each block. As information including the context modeling results, a probability table, in which a generation probability is matched to each bin, may be provided. Entropy encoding probability information according to the exemplary embodiment may include the context modeling results.

Therefore, when the context modeling information, that is, the entropy coding probability information, is ensured, the entropy encoding may be performed by allocating a code to each of the bits in binarized bit strings of the block symbols based on the context of the entropy coding probability information.

Also, the entropy encoding is performed by the arithmetic encoding/decoding based on the context, and the symbol code probability information may be updated in each block. Because the entropy coding is performed by using the updated symbol code probability information, a compression rate may be improved.

The video encoding method according to various exemplary embodiments is not limited to the video encoding method for the 'block', and may be used for various data units.

For efficiently performing the video encoding, the video is divided into blocks having predetermined sizes and then the blocks of predetermined sizes are encoded. A block may have a square shape or a rectangular shape, or may have an arbitrary geometric shape, but the block is not limited to a data unit having a predetermined size. According to the video encoding method based on the coding units having a tree structure, a block may be a maximum coding unit, a coding unit, a prediction unit, a transformation unit, or the like. The video encoding/decoding method based on the coding units having a tree structure will be described with reference to FIGS. 8 to 20.

Blocks in a picture are encoded according to a raster scanning direction.

The sub-region divider 102 divides a picture into one or more tiles, and each of the tiles may include blocks arranged according to a raster direction among the blocks of the picture. The picture may be divided into tiles as one or more vertical rows, tiles as one or more horizontal rows, or tiles as one or more vertical rows and one or more horizontal rows. Each of the tiles divides the spatial region, and the sub-region encoder 104 may encode each of the tiles independently in order to encode each of the spatial regions in operation S107.

Because each of the slice segments includes blocks arranged in the raster direction, the sub-region divider 102 may generate a slice segment by dividing the picture in a horizontal direction. The picture may be divided into one or more slice segments. Each of the slice segments may be transmitted through one network adaptation layer (NAL).

The sub-region encoder 104 of the present exemplary embodiment may perform encoding on the slice segments. The sub-region encoder 104 sequentially performs the encoding on the blocks included in each of the slice segments to generate encoding symbols of the blocks. Encoding data of the blocks may be included in one NAL unit to be transmitted in each of the slice segments. Each of the tiles may include at least one slice segment. If necessary, the slice segment may include at least one tile.

According to the exemplary embodiment, if the blocks of each of the slice segments are the maximum coding units including coding units according to a tree structure, a relationship between the slice segment and the tile may satisfy one of the following conditions: (i) the maximum coding units included in one slice segment may be included in the same tile, (ii) the maximum coding units included in one tile may be included in the same slice segment, and (iii) the maximum coding units included in one slice segment may be included in the same tile, and at the same time, the maximum coding units included in one tile may be included in one same slice segment. Among the above conditions, if the maximum coding units included in one slice segment are included in the same tile, it may be determined that the slice segment does not span over boundaries of the current tile. That is, each of the slice segments has to be completely included in the tile. That is, a first maximum coding unit and a last maximum coding unit among the maximum coding units of the slice segment may be included in the same tile. In particular, if the first maximum coding unit of the current slice segment is located at a center portion of the tile, the current slice segment should not span over the boundary of the current tile.

Also, the slice segments may be classified as dependent slice segments and independent slice segments.

If the current slice segment is a dependent slice segment, an in-picture prediction that refers to the encoding symbols of the previous slice segment that is previously encoded before the current slice segment may be performed. Also, if the current slice segment is a dependent slice segment, a dependent entropy encoding that refers to the entropy information of the previous slice segment may be performed.

If the current slice segment is an independent slice segment, the in-picture prediction referring to the encoding symbols of the previous slice segment is not performed and the entropy information of the previous slice segment is not referenced.

One slice of the present exemplary embodiment may include one independent slice segment and at least one dependent slice segment successive to the independent slice segment according to the raster scanning direction. One independent slice segment may configure one slice.

According to the exemplary embodiment, if the each slice segment and the blocks of the slice are the maximum coding units including the coding units according to a tree structure, a relationship between the slice and the tile may satisfy one of the following conditions: (i) the maximum coding units included in one slice are included in the same tiles, (ii) the maximum coding units included in one tile are included in the same slices, and (iii) the maximum coding units included in one slice are included in the same tiles, and at the same time, the maximum coding units included in one tile may be included in the same slices.

The sub-region encoder 104 of the present exemplary embodiment may encode each of the tiles, independently from the other tiles. The sub-region encoder 104 may sequentially encode the maximum coding units included in the current tile, in each of the tiles.

Also, the sub-region encoder 104 of the present exemplary embodiment may encode the maximum coding units in the current slice segment, in each of the slice segments. Among the maximum coding units included in the current slice segment, the maximum coding units included in a predetermined tile may be encoded according to an encoding order in the current tile.

The sub-region encoder 104 of the present exemplary embodiment may encode a plurality of maximum coding units included in the current slice segment according to the raster scanning order in the current tile, when all the maximum coding units of the current slice segment are included in the current tile. In this case, because the current slice segment does not span over the boundary of the current tile, the maximum coding units of the current slice segment are not located beyond the boundary of the current tile. In this case, the sub-region encoder 104 of the present exemplary embodiment may sequentially encode the at least one slice segment included in each tile, and may encode the plurality of blocks included in each of the slice segments according to the raster scanning order.

Also, in a case where the current slice segment includes at least one tile, the sub-region encoder 104 may encode the maximum coding units included in the current tile among the maximum coding units included in the current slice segment, according to the raster scanning order of the maximum coding units in the current tile. The sub-region encoder 104 of the present exemplary embodiment may sequentially encode the slice segments. Therefore, the sub-region encoder 104 of the present exemplary embodiment sequentially encodes the slice segments, and sequentially encodes the blocks included in each of the slice segments to generate encoding symbols of the blocks. In each of the blocks in the slice segment, intra prediction, inter prediction, transformation, in-loop filtering, sampling adaptive offset (SAO) compensation, and quantization may be performed.

The sub-region encoder 104 of the present exemplary embodiment performs the entropy encoding by using the encoding symbols generated in the blocks in each of the slice segments. The blocks included in each of the slice segments may be sequentially entropy encoded.

For performing prediction encoding on the encoding symbols generated during the source encoding process, for example, the intra sample, the motion vector, and the encoding mode information, in-picture prediction may be performed. In a case where the in-picture prediction is performed, a difference value between the current encoding symbol and the previous encoding symbol, instead of the current encoding symbol, may be encoded. In addition, a difference between the current sample and a neighboring sample, instead of the current sample, may be encoded.

Also, in order to perform the prediction encoding on the entropy context information or the code probability information generated during the entropy encoding process, a dependent entropy encoding may be performed. When the dependent entropy encoding is performed, the encoding of the current entropy information may be skipped in a case where the current entropy information and the previous entropy information are equal to each other.

However, because the sub-region encoder 104 may encode each of the tiles independently, the in-picture prediction or the dependent entropy encoding may not be performed on the maximum coding units included in different tiles.

The video encoding apparatus 101 of the present exemplary embodiment may include a central processor that controls the sub-region divider 102 and the sub-region encoder 104. Otherwise, the sub-region divider 102 and the sub-region encoder 104 may be driven respectively by their own processors, and the processors may operate together to control operations of the video encoding apparatus 101. Otherwise, the sub-region divider 102 and the sub-region encoder 104 may be controlled by an external processor external to the video encoding apparatus 101.

The video encoding apparatus 101 of the present exemplary embodiment may include one or more data storage units in which input/output data of the sub-region divider 102 and the sub-region encoder 104 is stored. The video encoding apparatus 101 may include a memory controller controlling the input/output data of the data storage units.

When the bit stream of the slice segment that is encoded according to the video encoding method (105) described with reference to FIGS. 1A and 1B is transmitted, a slice segment header may be transmitted together.

Hereinafter, a method of transmitting the slice segment header according to the characteristic of the slice segment will be described below with reference to FIGS. 1C and 1D. The above-described relationship between the sub-regions divided as the slice segment and blocks (maximum coding units), the tile, and the slices, and the encoding performed on each of the sub-regions with reference to FIGS. 1A and 1B may be applied to FIGS. 1C and 1D.

Figure 1C:
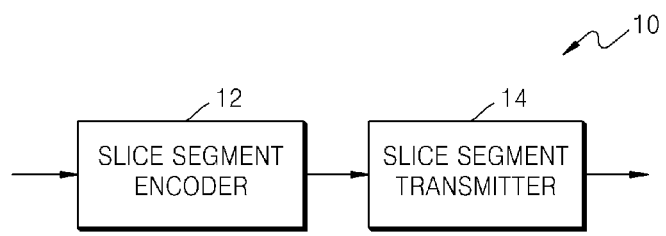
FIG. 1C is a block diagram of a video encoding apparatus encoding by spatial subdivisions, according to another exemplary embodiment.
Figure 1D:
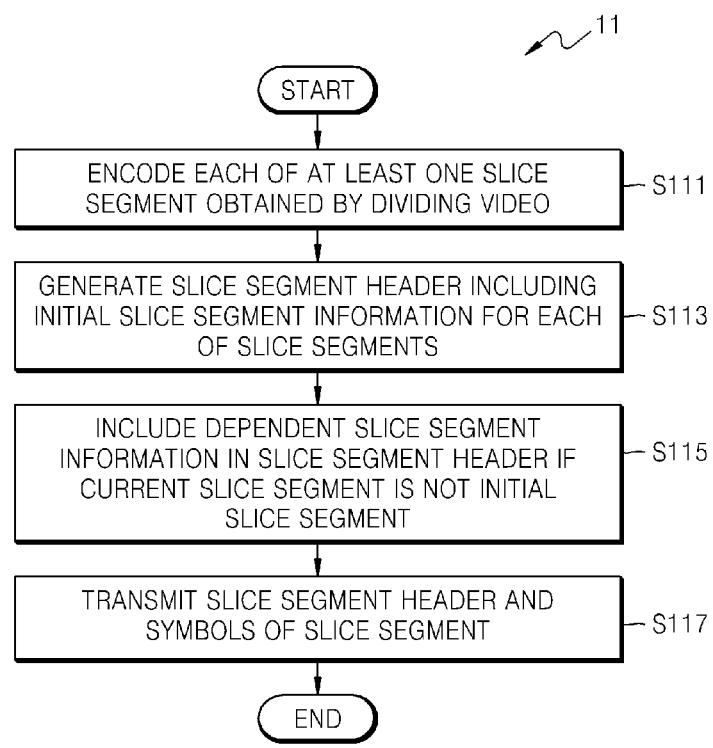
FIG. 1D is a flowchart illustrating a video encoding method executed by the video encoding apparatus of FIG. 1C.

FIG. 1C is a block diagram of a video encoding apparatus 10 encoding by spatial subdivisions, according to another exemplary embodiment. FIG. 1D is a flowchart illustrating a video encoding method 11 executed by the video encoding apparatus 10 of FIG. 1C.

The video encoding apparatus 10 of the present exemplary embodiment includes a slice segment encoder 12 and a slice segment transmitter 14. The slice segment encoder 12 and the slice segment transmitter 14 of the present exemplary embodiment may perform the source encoding process and the entropy encoding process, respectively. In operation S111, the slice segment encoder 12 may encode each of the slice segments after dividing a picture into at least one slice segment.

For example, if the blocks configuring the slice segment are the maximum coding units, the slice segment encoder 12 of the present exemplary embodiment may encode a plurality of maximum coding units included in the current slice segment according to the raster scanning order in the current tile. In operation S113, the slice segment transmitter 14 may generate a slice segment header including information representing whether the current slice segment is an initial slice segment in the current picture.

Default information about the current picture in which the current slice segment is included may be recorded in a picture parameter set (PPS) and transmitted. In particular, the PPS may include information representing whether the current picture includes dependent slice segments. Therefore, when the information representing whether the current picture includes the dependent slice segments is recorded in the PPS, the slice segment transmitter 14 may record information representing whether the current slice segment is a dependent slice segment that uses slice header information of the previous slice segment in the current slice segment header.

On the other hand, if the PPS of the current picture includes information representing that the dependent slice segment is not included in the current picture, the current slice segment header does not include the information representing whether the current slice segment is a dependent slice segment.

In operation S115, the slice segment transmitter 14 may add information representing whether the current slice segment is a dependent slice segment to the slice segment header, if the current slice segment is not the initial slice segment.

That is, in a case where the PPS of the current picture includes information representing that the dependent slice segment is used in the current picture and the current slice segment header includes the information representing that the current slice segment is not the initial slice segment, information representing whether the current slice segment is a dependent slice segment may be added to the current slice segment header. According to the exemplary embodiment, the initial slice segment is an independent slice segment. Therefore, the slice segment transmitter 14 may skip adding the information representing whether the slice segment is the dependent slice segment into the current slice segment header, if the current slice segment is the initial slice segment. Therefore, the slice segment transmitter 14 may transmit the slice segment header for the initial slice segment, by adding the information representing whether the slice segment is the initial slice segment and default information about the current slice segment to the slice segment header.

Therefore, in a case where the dependent slice segment may be used in the current picture and the current slice segment is not the initial slice segment, the information representing whether the current slice segment is a dependent slice segment may be added to the current slice segment header.

However, if the current slice segment is not the initial slice segment, but the dependent slice segment, some of the default information about the slice segment may be equal to that of the previous slice segment header information. Therefore, the current slice segment header includes the information representing whether the current slice segment is the initial slice segment or the dependent slice segment, and inserting of the information equal to that of the previous slice segment header into the current slice segment header may be skipped.

According to the exemplary embodiment, if the current slice segment is not the dependent slice segment, the current slice segment header may further include various header information for the current slice segment, while including the information representing whether the current slice segment is a dependent slice segment.

For example, the slice segment transmitter 14 may record a quantization parameter and initial probability information of the context for the entropy encoding in the slice segment header, and transmits the slice segment header.

However, if the current slice segment is a dependent slice segment, the slice segment transmitter 14 may perform in-picture prediction that refers to the encoding symbol of the previous slice segment that is encoded before the current slice segment. When the current slice segment is the dependent slice segment, the slice segment transmitter 14 may perform the dependent entropy encoding that refers to the entropy information of the slice segment that is previously encoded.

Therefore, the slice segment transmitter 14 does not record the quantization parameter and the initial probability information in the slice segment header of the current slice header, when the current slice segment is the dependent slice segment because the quantization parameter and the initial probability information of the dependent slice segment may be initialized as the quantization parameter and the initial probability information recorded in the header information of the independent slice segment that is previously encoded.

If the current slice segment is an independent slice segment, the slice segment transmitter 14 may output a bit stream of the encoding symbol of the current slice segment without regard to the previous slice segment, because the in-picture prediction is not performed. If the current slice segment is an independent slice segment, the slice segment transmitter 14 may output entropy information of the current slice segment without regard to the entropy information of the neighboring slice segment that is previously encoded. For example, if the current slice segment is an independent slice segment, the quantization parameter and the initial probability information are recorded in the current slice segment header.

In operation S117, the slice segment transmitter 14 may transmit the slice segment header and the symbols of the slice segment with respect to each of the slice segments.

The video encoding apparatus 10 of the present exemplary embodiment may include a central processor that controls operations of the slice segment encoder 12 and the slice segment transmitter 14. Otherwise, the slice segment encoder 12 and the slice segment transmitter 14 may be driven by their own processors, and the processors may operate together to operate the video encoding apparatus 10. Otherwise, the slice segment encoder 12 and the slice segment transmitter 14 may be controlled by an external processor external to the video encoding apparatus 10.

The video encoding apparatus 10 of the present exemplary embodiment may include one or more data storage units in which input/output data of the slice segment encoder 12 and the slice segment transmitter 14 is stored. The video encoding apparatus 10 may include a memory controller for controlling input/output data of the data storage units.

Processes of decoding video by using the bit stream in which the data encoded according to the spatial subdivisions, as described with reference to FIGS. 1A and 1B, will be described below with reference to FIGS. 2A and 2B. Concepts of the slice segment, the tile, and the slice defined as the spatial subdivisions in FIGS. 1A and 1B may be applied to a video decoding process that will be described below.

Figure 2A:
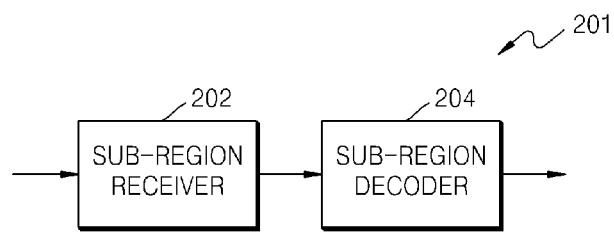
FIG. 2A is a block diagram of a video decoding apparatus decoding by spatial subdivisions, according to an exemplary embodiment.
Figure 2B:
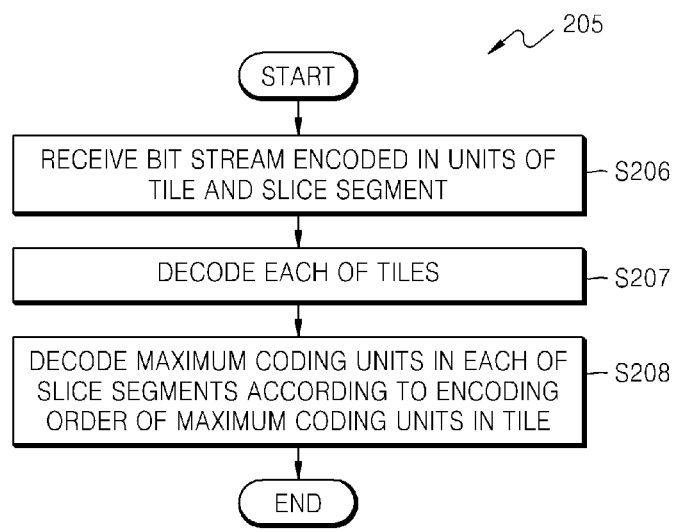
FIG. 2B is a flowchart illustrating a video decoding method executed by the video decoding apparatus of FIG. 2A.

FIG. 2A is a block diagram of a video decoding apparatus 201 that decodes according to spatial subdivisions according to an exemplary embodiment. FIG. 2B is a flowchart illustrating a video decoding method (205) executed by the video decoding apparatus 201 of FIG. 2A.

The video decoding apparatus 201 of the present exemplary embodiment includes a sub-region receiver 202 and a sub-region decoder 204.

In operation S206, the sub-region receiver 202 may receive a bit stream that is generated as a result of processes of dividing a picture into two or more tiles and at least one slice segment and encoding the divisions. The bit stream may be data generated in each of the slice segments and data generated in each tile.

The sub-region receiver 202 of the present exemplary embodiment may parse encoding symbols with respect to each slice segment from the bit stream. Also, the sub-region receiver 202 of the present exemplary embodiment may parse encoding symbols with respect to each tile from the bit stream. Hereinafter, processes of performing a decoding operation in each tile and the slice segments by the sub-region decoder 204 will be described with reference to operations S207 and S208.

In operation S207, the sub-region decoder 204 may decode a tile by using the encoding symbols of the tile parsed from the bit stream. In addition, in operation S208, the sub-region decoder 204 of the present exemplary embodiment may decode a current slice segment by using the encoding symbols of the slice segment parsed from the bit stream.

Finally, the sub-region decoder 204 may restore a picture by combining the tile and the slice segments reconstructed in operations S207 and S208.

When the sub-region decoder 204 of the present exemplary embodiment receives each of the slice segments through one NAL unit, encoding data of the blocks may be included in each of the slice segments. According to the present exemplary embodiment, each of the tiles may include at least one slice segment. If necessary, the slice segment may include at least one tile.

According to the exemplary embodiment, if blocks in each of the slice segments are the maximum coding units including the coding units according to a tree structure, a relationship between the slice segment and the tile may satisfy one of the following conditions: (i) the maximum coding units included in one slice segment may be included in the same tiles, (ii) the maximum coding units included in one tile may be included in the same slice segments, and (iii) the maximum coding units included in one slice segment may be included in the same tiles and the maximum coding units included in one tile may be included in the same slice segments. Among the above conditions, if (i) the maximum coding units included in one slice segment are included in the same tiles, the slice segment may be determined not to span over a boundary of the current tile. That is, each of the slice segments should be completely included in the tile. That is, a first maximum coding unit and a last maximum coding unit among the maximum coding units in the slice segment may be included in the same tile. In particular, if the first maximum coding unit of the current slice segment is located at a center of the tile, the current slice segment should not span over the boundary of the current tile.

According to the exemplary embodiment, if the each slice segment and the blocks of the slice are the maximum coding units including the coding units according to a tree structure, a relationship between the slice and the tile may satisfy one of the following conditions: (i) the maximum coding units included in one slice are included in the same tiles, (ii) the maximum coding units included in one tile are included in the same slices, and (iii) the maximum coding units included in one slice are included in the same tiles, and at the same time, the maximum coding units included in one tile may be included in the same slices.

The sub-region decoder 204 of the present exemplary embodiment may decode each of the tiles, independently from the other tiles. In one NAL unit, the maximum coding units included in the current tile may be sequentially decoded.

The sub-region decoder 204 of the present exemplary embodiment may perform entropy decoding on the maximum coding units in each of the slice segments and the tiles to parse the encoding symbols for each of the maximum coding units. The maximum coding units included in the slice segment and the tile are sequentially entropy decoded to parse the encoding symbols for each of the maximum coding units.

Therefore, the sub-region decoder 204 of the present exemplary embodiment may decode the maximum coding units in the current slice segment. The sub-region decoder 204 may sequentially decode the maximum coding units according to the raster scanning direction by using the encoding symbols of the maximum coding units that are parsed in each of the slice segments.

Also, the maximum coding units included in a predetermined tile among the maximum coding units included in the current slice segment may be decoded according to a decoding order in the current tile.

The sub-region decoder 204 of the present exemplary embodiment may decode a plurality of maximum coding units included in the current slice segment according to the raster scanning order of the current tile, when the entire maximum coding units of the current slice segment are included in the current tile. In this case, the current slice segment does not span over the boundary of the current tile. The sub-region decoder 204 of the present exemplary embodiment sequentially decodes the at least one slice segment included in each tile, and may decode the plurality of maximum coding units included in the slice segment according to the raster scanning order.

Also, if the current slice segment includes at least one tile, the sub-region decoder 204 may decode the maximum coding units included in the current tile, among the maximum coding units included in the current slice segment, according to the raster scanning order of the maximum coding units in the current tile.

An in-picture prediction may be performed by using encoding symbols, such as an intra sample, a motion vector, and encoding mode information parsed with respect to each of the maximum coding units. Through the in-picture prediction, a reconstructed value of the current encoding symbol may be determined by combining a reconstructed value of the previous encoding symbol and a difference between the current encoding symbol and the previous encoding symbol. Also, a reconstructed value of the current sample may be determined by combining a reconstructed value of a neighboring sample that is previously reconstructed and a difference between the current sample and the previous sample.

The decoding operation using the encoding symbols of the maximum coding units may be performed through an inverse-quantization, an inverse-transformation, and an intra prediction/motion compensation. For example, the inverse-quantization of the encoding symbols of each maximum coding unit is performed to reconstruct transformation coefficients of transformation units, and the transformation coefficients of the transformation units are inverse-transformed to reconstruct residual information of prediction units. An intra prediction may be performed by using the intra sample in the residual information. Also, samples of the current prediction unit may be reconstructed through a motion compensation, in which another reconstructed prediction unit designated by the motion vector and the residual information are combined. In addition, the SAO compensation and in-loop filtering may be performed on the maximum coding units.

Therefore, the sub-region decoder 204 of the present exemplary embodiment may sequentially decode the maximum coding units in each of the slice segments and each of the tiles according to the decoding order in the tile.

According to the exemplary embodiment, if the tile includes at least one slice segment, the maximum coding units in each slice segment are decoded to reconstruct each slice segment, and then, the reconstructed results are combined to reconstruct one tile.

Also, according to the exemplary embodiment, if the slice segment includes at least one tile, the maximum coding units of each tile are decoded to reconstruct the tile, and the reconstructed results of the tiles are combined to reconstruct the slice segment.

The sub-region decoder 204 of the present exemplary embodiment may reconstruct a picture consisting of the reconstructed tiles or the reconstructed slice segments.

Processes of decoding video by using the bit stream in which data encoded according to the spatial subdivisions as described with reference to FIGS. 1C and 1D will be described below with reference to FIGS. 2C and 2D. Concepts of the slice segments, tiles, and the slice defined as the spatial subdivisions in FIGS. 1C and 1D may be applied to the video decoding method that will be described below.

When receiving the bit stream of the slice segments that are decoded according to the video decoding method (205) described with reference to FIGS. 2A and 2B, slice segment headers may be received together. Hereinafter, processes of decoding video by using a slice segment header will be described below with reference to FIGS. 2C and 2D.

Figure 2C:
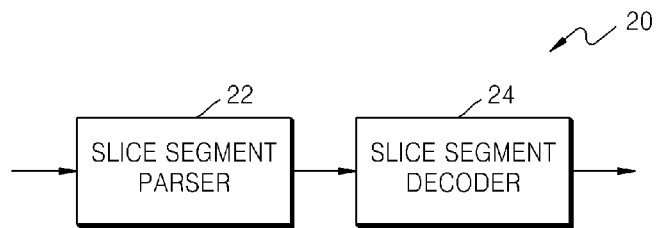
FIG. 2C is a block diagram of a video decoding apparatus decoding by spatial subdivisions, according to another exemplary embodiment.
Figure 2D:
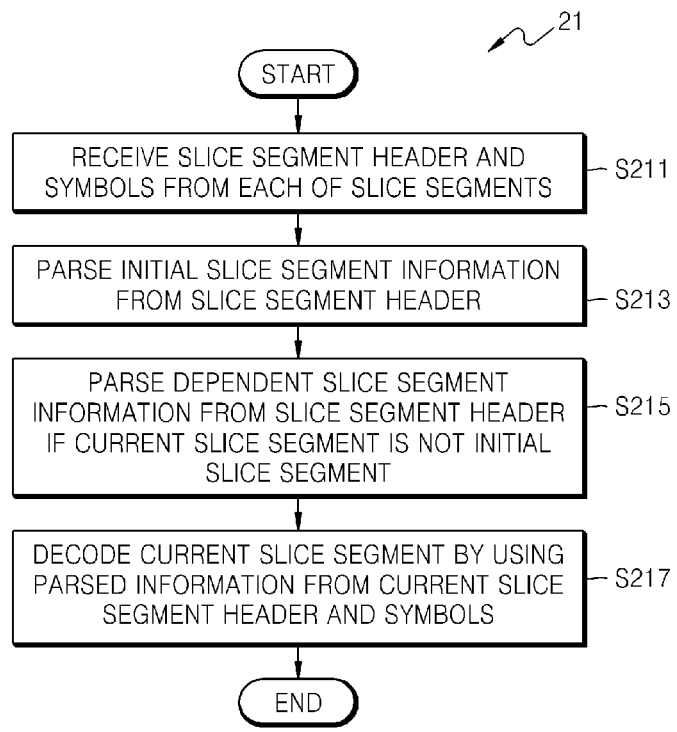
FIG. 2D is a flowchart illustrating a video decoding method executed by the video encoding apparatus of FIG. 2C.

FIG. 2C is a block diagram of a video decoding apparatus 20 decoding by spatial subdivisions, according to another exemplary embodiment. FIG. 2D is a flowchart of a video decoding method (21) executed by the video decoding apparatus 20 of FIG. 2C.

The video decoding apparatus 20 of the present exemplary embodiment includes a slice segment parser 22 and a slice segment decoder 24. FIGS. 2C and 2D illustrate the slice segments; however, a relationship between the slice segment and the tile, and the slice segment are described above with reference to FIGS. 2A and 2B.

In operation S211, the video decoding apparatus 20 of the present exemplary embodiment may receive the bit stream that is generated by encoding the picture in the slice segment unit. The bit stream of each slice segment may include a slice segment header and encoding symbols. The slice segment parser 22 according to the present exemplary embodiment may receive the bit stream of each of the slice segments, wherein the bit stream includes the slice segment header and the symbols. The slice segment parser 22 of the present exemplary embodiment may parse the symbols of the current slice segment in the bit stream. The slice segment parser 22 according to the present exemplary embodiment parses the slice segment header of the current slice segment in the bit stream, and may parse various pieces of header information about the current slice segment from the slice segment header.

Hereinafter, a method of parsing the slice segment header by the slice segment parser 22 according to the characteristics of the slice segment will be described below with reference to operations S213 through S217.

In operation S213, the slice segment parser 22 of the present exemplary embodiment may parse information representing whether the current slice segment is an initial slice segment in the current picture from the slice segment header of the current slice segment.

If the slice segment parser 22 determines that the current slice segment is not the initial slice segment from the parsed information, the process goes to operation S215.

In operation S215, if the current slice segment is not the initial slice segment, the slice segment parser 22 may further parse information representing whether the current slice segment is a dependent slice segment using the slice header information of the previous slice segment, from the current slice segment header.

However, the information representing whether the current picture includes the dependent slice segment may be parsed from PPS about the current picture including the current slice segment. Therefore, in a case where the information representing that the current picture includes the dependent slice segment is parsed from the PPS of the current picture, the slice segment parser 22 may parse information representing whether the current slice segment is a dependent slice segment, from the current slice segment header.

On the other hand, if the information representing that the current picture does not use the dependent slice segment is parsed from the PPS of the current picture, the information representing whether the current slice segment is a dependent slice segment is not parsed from the current slice segment header.

Therefore, if the information representing that the current picture includes the dependent slice segment is parsed from the PPS of the current picture and the information representing that the current slice segment is not the initial slice segment is parsed in operation S213, the slice segment parser 22 may further parse information representing whether the current slice segment is a dependent slice segment, from the current slice segment. That is, if the current picture includes the dependent slice segment and the current dependent slice segment is not the initial slice segment, the information representing whether the current slice segment is a dependent slice segment may be further parsed from the current slice segment header.

In operation S213, if the slice segment parser 22 determines that the current slice segment is the initial slice segment from the parsed information, the information representing whether the current slice segment is a dependent slice segment is not parsed from the current slice segment header. Because the initial slice segment cannot be the dependent slice segment, the initial slice segment may be determined as an independent slice segment without using the parsing information. Therefore, if the current slice segment is the initial slice segment, the slice segment parser 22 of the present exemplary embodiment may further parse information representing whether the slice segment is the initial slice segment and default information about the current slice segment from the initial slice segment header of the picture.

If the slice segment parser 22 reads that the current slice segment is the dependent slice segment from the information parsed from the current slice segment header, the slice segment parser 22 may determine some of the header information parsed from the previous slice segment header as default information of the current slice segment.

If the slice segment parser 22 determines that the current slice segment is not the dependent slice segment from the information parsed from the current slice segment header, the slice segment parser 22 may parse various pieces of header information of the current slice segment from the current slice segment header.

In operation S217, the slice segment decoder 24 of the present exemplary embodiment may decode the current slice segment by using the information parsed from the current slice segment header and the symbols of the current slice segment.

Also, the slice segment decoder 24 of the present exemplary embodiment may reconstruct at least one slice segment included in each of the tiles, including the current slice segment reconstructed through the decoding operation in operation S217, and may restore the picture by combining the reconstructed tiles.

The slice segment parser 22 of the present exemplary embodiment may parse symbols of the plurality of blocks included in the current slice segment according to a raster scanning order, in each of the slice segments included in each of the tiles. Also, the slice segment decoder 24 of the present exemplary embodiment may decode the blocks according to the raster scanning order by using the symbols of the blocks, which are parsed according to the raster scanning order of the blocks.

The slice segment parser 22 of the present exemplary embodiment may perform entropy decoding on the bit stream of each of the slice segments to parse the encoding symbols for each of the maximum coding units. The maximum coding units included in the slice segment are sequentially entropy decoded to parse the encoding symbols of each of the maximum coding units.

Therefore, the slice segment decoder 24 of the present exemplary embodiment may perform the decoding of each of the maximum coding units sequentially according to the raster scanning order, by using the parsed encoding symbols of the maximum coding units in each of the slice segments.

Therefore, the slice segment decoder 24 of the present exemplary embodiment may sequentially decode the maximum coding units in each of the slice segments to reconstruct each slice segment, and may reconstruct the picture consisting of the reconstructed slice segments.

As described above with reference to FIGS. 1A through 2B, the picture may be divided into tiles or slice segments. A tile is a data unit for encoding or decoding the picture independently in each spatial subdivision unit, and the slice segment is a unit divided for transferring data. Therefore, during encoding or decoding tiles, encoding information of other tiles may not be referred to at a boundary between adjacent tiles. However, in the encoding or decoding processes of the slice segments, encoding information of other slice segments may be selectively referred to at a boundary between the adjacent slice segments.

Therefore, because characteristics of the slice segment and the tile are different from each other in performing the prediction encoding, there may be a problem when the slice segment and the tile spatially overlap each other. For example, if one slice segment includes a boundary between the tiles, blocks of the same slice segment may be located in different tiles based on the boundary between the tiles. In this case, it is unclear whether the blocks crossing over the boundary between the tiles may be encoded or decoded by referring to each other.

Therefore, according to the video encoding apparatus 101 and the video decoding apparatus 201 of the present exemplary embodiment, relationships between the tile, the slice segment, and the slice are clearly defined so that accessibility to the references of the maximum coding units at boundaries between the tiles, between the slice segments, and between the slices may be clearly regulated.

Also, because the initial slice segment is always an independent slice segment, there is no need to determine whether the initial slice segment is the dependent slice segment. Therefore, according to the video encoding apparatus 10 and the video decoding apparatus 20 described with reference to FIGS. 1C, 1D, 2C, and 2D, information representing whether the current slice segment is the initial slice segment of the picture is included in the slice segment header, and in a case of the initial slice segment, the information representing whether the current slice segment is a dependent slice segment may not be included in the slice segment header. Accordingly, a transmission bit amount for transferring unnecessary header information may be reduced, and unnecessary parsing information for reading the header information may be skipped.

Hereinafter, relationships between the slice segment, tile, and the slice that are the sub-regions used in the video encoding apparatus 101 and the video decoding apparatus 201 according to exemplary embodiments will be described below with reference to FIGS. 3 through 6B.

Figure 3:
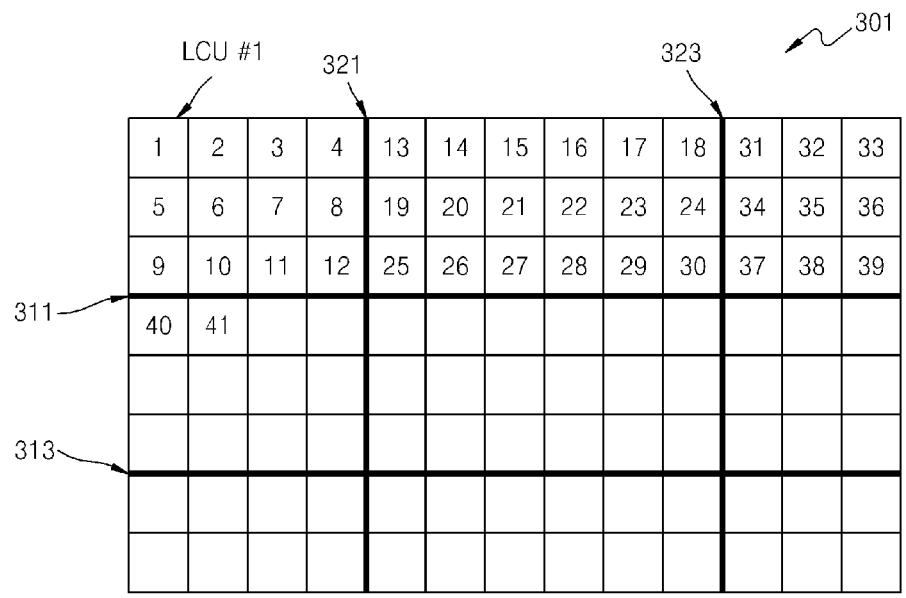
FIG. 3 is a diagram showing tiles and maximum coding units in a picture.

FIG. 3 shows tiles and maximum coding units in a picture.

When performing encoding and decoding on each of the regions generated by dividing a picture 301 in at least one of a vertical direction and a horizontal direction, each of the regions may be referred to as a tile. In order to process a large amount of data of a high-definition (HD) or ultra high-definition (UHD) video in real-time, the picture 301 may be divided into at least one column and at least one row to generate tiles, and the encoding and decoding may be performed with on each of the tiles.

In the picture 301, because each of the tiles is a spatial region that is independently encoded or decoded, the tile at a desired region may be selectively encoded or decoded.

In FIG. 3, the picture 301 may be divided into the tiles by column boundaries 321 and 323 and row boundaries 311 and 313. A region surrounded by one of the column boundaries 321 and 323 and one of the row boundaries 311 and 313 includes the tiles.

If the picture 301 is divided into tiles to be encoded, information about locations of the column boundaries 321 and 323 and the row boundaries 311 and 313 may be recorded in a sequence parameter set (SPS) or a PPS and transmitted. When decoding the picture 301, the information about the locations of the column boundaries 321 and 323 and the row boundaries 311 and 313 is parsed from the SPS or the PPS to decode each of the tiles, and then, each of the sub-regions of the picture 301 is reconstructed, and the sub-regions may be reconstructed as the picture 301 by using the information about the column boundaries 321 and 323 and the row boundaries 311 and 313.

The picture 301 is divided into the maximum coding units (largest coding unit, LCU), and the encoding is performed on each of the blocks. Therefore, each of the tiles that are generated by dividing the picture 301 by the column boundaries 321 and 323 and the row boundaries 311 and 313 may include the maximum coding units. The column boundaries 321 and 323 and the row boundaries 311 and 313 dividing the picture 301 extend along boundaries between neighboring maximum coding units, and thus, do not divide the maximum coding units. Therefore, each of the tiles may include an integer number of maximum coding units.

Therefore, the encoding or decoding may be performed on each of the maximum coding units in each of the tiles, while performing processes with respect to each of the tiles in the picture 301. In FIG. 3, numeric characters representing the maximum coding units denote a scanning order of the maximum coding units in the tile, that is, a processing order for being encoded or decoded.

The tile may be compared with the slice segment and the slice, in view that the encoding and decoding of the tiles are independently performed from each other. Hereinafter, the slice segment and the slice will be described below with reference to FIG. 4.

Figure 4:
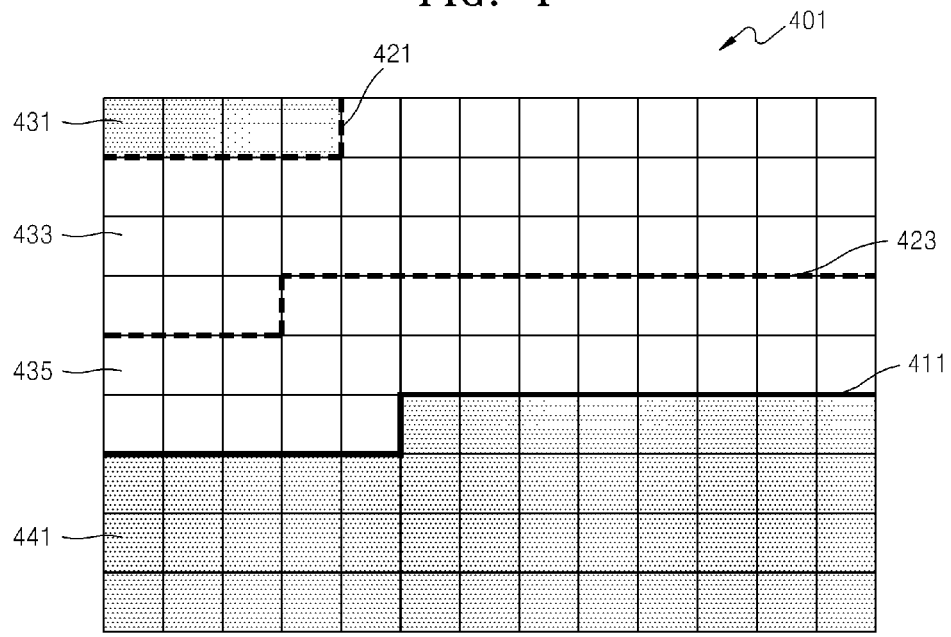
FIG. 4 is a diagram showing a slice segment, a slice, and maximum coding units in a picture.

FIG. 4 shows the slice segment, the slice, and the maximum coding units in a picture 401.

The picture 401 is divided into a plurality of maximum coding units. In FIG. 4, the picture 401 is divided into 117 maximum coding units, that is, 13 maximum coding unit in a horizontal direction and 9 maximum coding units in a vertical direction. Each of the maximum coding units may be divided into the coding units having a tree structure to be encoded or decoded.

The picture 401 is divided into two slices by a boundary line 411. In addition, the picture 401 is divided into slice segments 431, 433, 435, and 441 by boundary lines 421, 423, and 411.

The slice segments 431, 433, 435, and 441 may be classified as dependent slice segments and independent slice segments. In a dependent slice segment, information used or generated during source encoding and entropy encoding processes of a predetermined slice segment may be referred to in order to perform the source encoding and the entropy encoding of the other slice segments. Likewise, parsing information in the entropy decoding process of a predetermined slice segment among the dependent slice segments and the information used or reconstructed in the source decoding may be referred to in order to perform the entropy decoding and the source decoding on the other slice segments.

In an independent slice segment, the information used or generated in the source encoding and the entropy encoding of each slice segment is not referenced, and the independent slice segment is independently encoded. Likewise, parsing information and reconstructed information of other slice segments are not used at all in the entropy decoding and the source decoding of the independent slice segment.

Information representing whether the slice segment is a dependent slice segment or an independent slice segment may be recorded in a slice segment header and transmitted. When decoding the picture 401, information about the slice segment type is parsed from the slice segment header, and it may be determined whether the current slice segment will be reconstructed by referring to other slice segments or decoded independently from the other slice segments according to the type of the slice segment.

In particular, values of syntax elements of the slice segment header in the independent slice segment, that is, header information, may not be deduced from the header information of the previous slice segment. However, the header information of the slice segment header in the dependent slice segment may be deduced from the header information of the previous slice segment.

Each of the slices may include an integer number of maximum coding units. Also, one slice may include at least one slice segment. If one slice includes only one slice segment, the slice segment may be an independent slice segment. Also, one slice may include one independent slice segment and at least one dependent slice segment next to the independent slice segment. The at least one slice segment included in one slice may be transmitted or received via the same access unit.

An upper slice of the picture 401 includes one independent slice segment 431 and two dependent slice segments 433 and 435. A lower slice of the picture 401 includes only one independent slice segment 441.

Figure 5A:
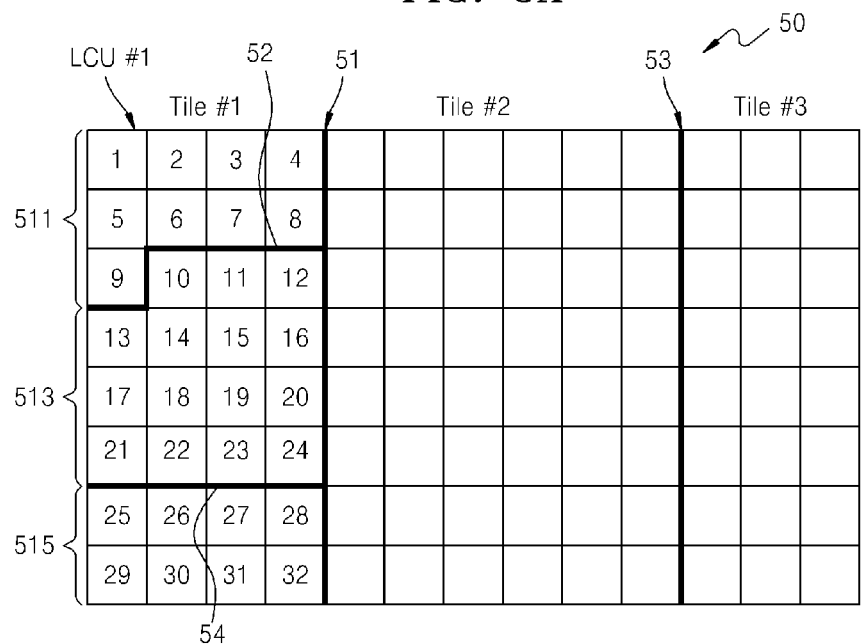
FIGS. 5A and 5B are diagrams for describing a relationship between the tiles and the slice segments in the picture.
Figure 5B:
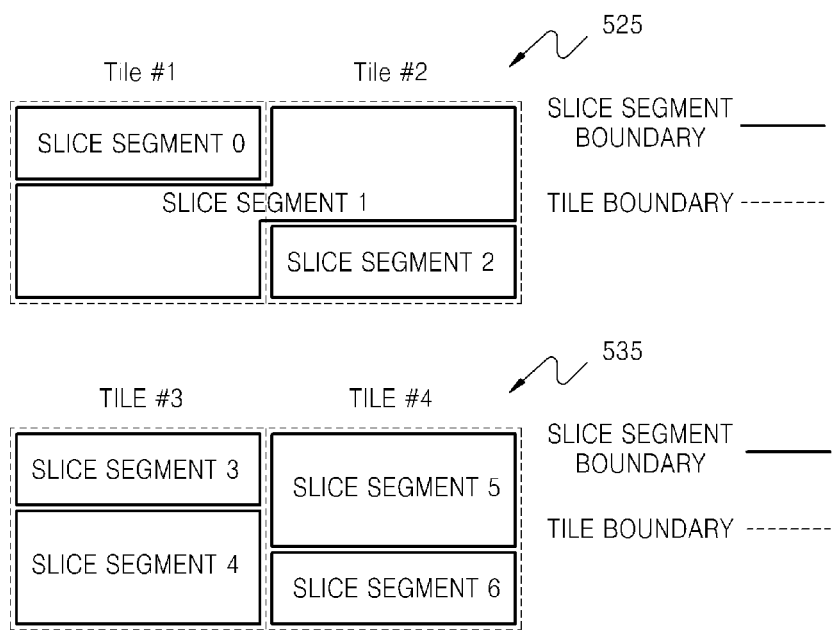

FIGS. 5A and 5B show a relationship between the tile and the slice segment in a picture 50.

Referring to FIG. 3, the picture 301 is divided by the column boundaries 321 and 323 and the row boundaries 311 and 313 to form the tiles. However, as shown in FIG. 5A, the picture 50 may be divided only by column boundaries 51 and 53. That is, the picture 50 is divided by two column boundaries 51 and 53 to generate three tiles, that is, a tile #1, a tile #2, and a tile #3. Also, the tile #1 may be divided by two row boundaries 52 and 54 to form three slice segments 511, 513, and 515.

That is, the slice segments are generated by dividing the tile in a horizontal direction, and the tiles are generated by dividing the picture 50 in a vertical direction.

Each of the slice segments 511, 513, and 515 includes an integer number of maximum coding units. In addition, each of the slice segments 511, 513, and 515 may be obtained by dividing the current tile to include the maximum coding units arranged according to the scanning order of the maximum coding units in the current tile. The maximum coding units in each of the slice segments 511, 513, and 515 may be included in one NAL unit. Therefore, each of the slice segments 511, 513, and 515 may be independently transmitted or received and encoded or decoded.

An inclusion relation between the tiles and the slice segments will be described below with reference to FIG. 5B. A picture 525 is divided into two tiles #1 and #2, and three slice segments 0, 1, and 2. Because an in-picture prediction and a dependent entropy encoding referring to each other may not be performed between different tiles, the tile #2 may not refer to encoding symbols and entropy information of the tile #1 beyond the boundary of the tiles.

However, the slice segments 0, 1, and 2 of the picture 525 need to refer to encoding symbols and entropy information of other maximum coding units while encoding the maximum coding units thereof according to the scanning order. Because the slice segment 1 spans over the tile #1 and the tile #2, some of the maximum coding units of the slice segment 1 may not refer to encoding symbols or entropy information of the other maximum coding units included in different tiles. Therefore, configurations of the tiles #1 and #2 and the slice segment 1 in the picture 525 are not appropriate.

A picture 535 includes two tiles #3 and #4 and four slice segments 3, 4, 5, and 6. Also, the tile #3 includes two slice segments 3 and 4, and the tile #4 includes two slice segments 5 and 6.

The slice segments 3 and 4 are completely embedded in the tile #3, and the slice segments 5 and 6 are completely embedded in the tile #4. Therefore, the slice segments 3, 4, 5, and 6 do not span over the boundary between the tiles #3 and #4.

According to the structure of the picture 535 including the tiles #3 and #4 and the slice segments 3, 4, 5, and 6, the dependency of the in-picture prediction and the entropy prediction in each of the slice segment may be ensured.

For example, because the maximum coding units of the slice segment 3 and the maximum coding units of the slice segment 4 are included in the same tile #3, the maximum coding units may be encoded or decoded sequentially according to the scanning orders, respectively. The maximum coding units of the slice segments 3 and 4 may refer to encoding symbols or entropy information of other maximum coding units included in the same slice segments.

Also, because the slice segments 3 and 4 in the tile #3 are encoded or decoded in the stated order, if the slice segment 4 is a dependent slice segment, the slice segment 4 may be encoded or decoded by using encoding symbols or entropy information of the slice segment 3.

The tiles #3 and #4 may be independently encoded or decoded from each other, without referring to each other.

Also, the slice segments 5 and 6 may be encoded or decoded in the stated order in the tile #4. Because the maximum coding units of the slice segment 5 and the maximum coding units of the slice segment 6 are included in the same tile #4, each of the slice segment 5 and 6 may be encoded or decoded according to the scanning order. The maximum coding units of the slice segments 5 and 6 may refer to encoding symbols or entropy information of other maximum coding units included in the same slice segments.

Because the slice segment 5 is an independent slice segment that may not refer to the tile #3, the slice segment 5 may be entropy encoded or entropy decoded by using initialized entropy information. If the slice segment 6 is a dependent slice segment, the slice segment 6 may be entropy encoded or entropy decoded by using entropy information of the slice segment 5. In a case of the in-picture prediction, the slice segment 5 is independently processed, and the slice segment 6 may refer to information of the slice segment 5.

Figure 6A:
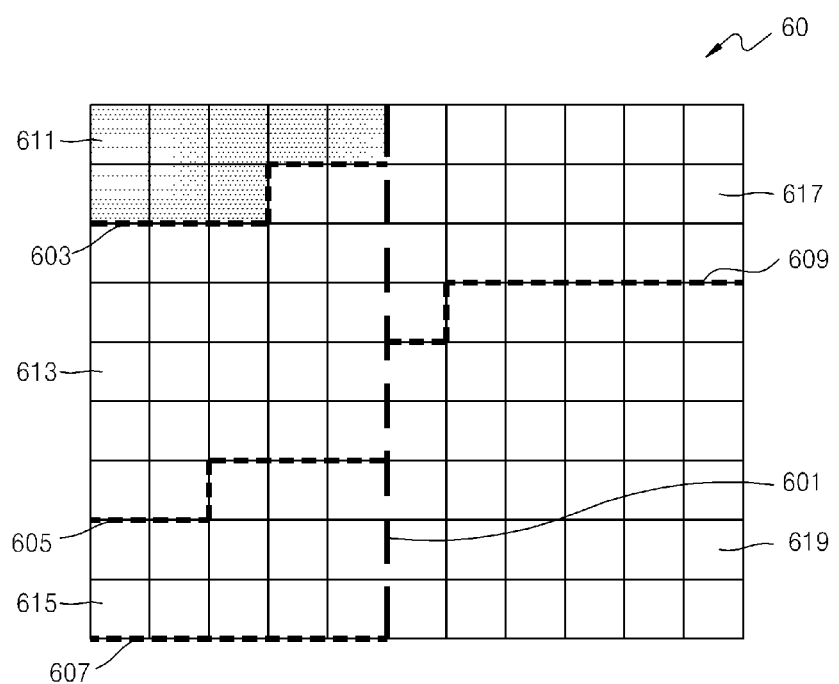
FIGS. 6A and 6B are diagrams for describing a relationship between the tiles, the slice segments, the slice, and the maximum coding units.
Figures 6B, 7:
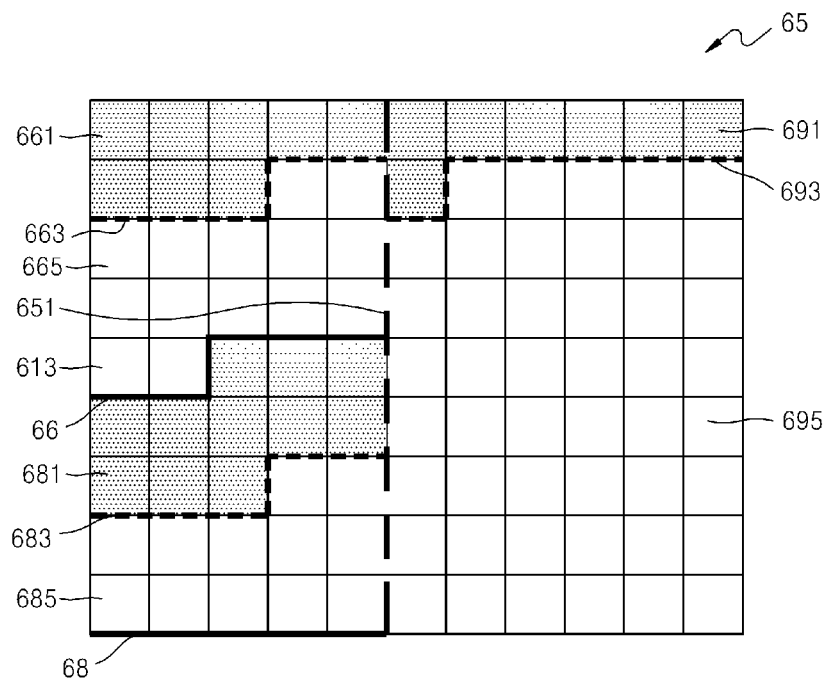
FIG. 7 is a diagram showing syntax of a slice segment header according to an exemplary embodiment.

FIGS. 6A and 6B show relationships between the tile, the slice segment, and the maximum coding units.

The slice segment included in the current tile may be located not to span over the boundary of the current tile. That is, the slice segment may be included in the tile.

Also, the slice including one independent slice segment or one independent slice segment and at least one dependent slice segment may be located so that the slice segment included therein does not span over the boundary of the current tile including the corresponding slice segment. That is, the slice may be included in the tile.

However, if the slice or the slice segment completely includes the current tile, it may be allowed that the slice or the slice segment is greater than the current tile.

If the coding units configuring each of the slice segments, each of the tiles, and each of the slices are maximum coding units including coding units according to a tree structure, relations between the slice segment, the slice, and the tile may be defined by using the maximum coding units, as follows:

The maximum coding units that are encoded (decoded) according to the scanning order in each of the tiles and in each of the slice segments should satisfy one of the following conditions:

(i) the maximum coding units included in one slice segment may be included in the same tile;

(ii) the maximum coding units included in one tile may be included in the same slice segment; and (iii) the maximum coding units included in one slice segment may be included in the same tile, and the maximum coding units included in one tile may be included in the same slice segment.

In addition, the maximum coding units that are encoded (decoded) according to the raster scanning order in each of the slices and each of the tiles should satisfy one of the following conditions:

(a) the maximum coding units included in one slice may be included in the same tile;

(b) the maximum coding units included in one tile may be included in the same slice; and (c) the maximum coding units included in one slice may be included in the same tile, and the maximum coding units included in one tile may be included in the same slice.

Referring to FIG. 6A, a picture 60 is divided into five slice segments 611, 613, 615, 617, and 619 by slice segment boundaries 603, 605, 607, and 609. Also, a slice is configured by one independent slice segment 611 and four dependent slice segments 613, 615, 617, and 619, and thus, the picture 60 includes one slice.

Also, the picture 60 is divided into two tiles by a tile boundary 601. Accordingly, a left tile includes three slice segments 611, 613, and 615, and a right tile includes two slice segments 617 and 619.

It will be considered whether the maximum coding units in the slice segments 611, 613, 615, 617, and 619 and the tiles satisfy one of the conditions i, ii, and iii as follows. Because the maximum coding units of the slice segments 611, 613, and 615 are included in the left tile, the maximum coding units satisfy condition (i). Also, the maximum coding units of the slice segments 617 and 619 are included in the right tile, the maximum coding units satisfy condition (i).

Then, it will be considered whether the maximum coding units of the slice and the tile satisfy one of the conditions a, b, and c, as follows: Because the maximum coding units of the left tile are included in one slice, condition (b) is satisfied. Also, because the maximum coding units in the right tile are included in one slice, condition (b) is satisfied.

Referring to FIG. 6B, a picture 65 is divided into two tiles, that is, a left tile and a right tile by a tile boundary 651. Also, the picture 65 is divided into three slices by slice boundaries 66 and 68, and thus, the left tile is divided into an upper left slice and a lower left slice based on the slice boundary 66, and the right tile may configure one right slice.

The upper left slice may be divided into one independent slice segment 661 and one dependent slice segment 665 based on the slice segment boundary 663. The lower left slice may be divided into one independent slice segment 681 and one dependent slice segment 685 based on a segment boundary 683. The right slice may be divided into one independent slice segment 691 and one dependent slice segment 695 based on a slice segment boundary 693.

It will be considered whether the maximum coding units in the slice segments 661, 665, 681, 685, 691, and 695 and the tiles satisfy one of the conditions i, ii, and iii, as follows: Because the maximum coding units of the slice segments 661 and 665 are included in the left tile, the maximum coding units satisfy condition (i). Also, the maximum coding units of the slice segments 681 and 685 are included in the left tile, the maximum coding units satisfy condition (i). In addition, the maximum coding units of the slice segments 691 and 695 are included in the right tile, condition (i) is satisfied.

Then, it will be considered whether the maximum coding units of the slice and the tile satisfy one of the conditions a, b, and c, as follows: Because the maximum coding units of the upper left slice are included in the left tile, condition (a) is satisfied. Also, because the maximum coding units in the lower left slice are included in the left tile, condition (a) is satisfied. In addition, because the maximum coding units of the right slice are included in the right tile and the maximum coding units of the right tile are included in the right slice, condition (c) is satisfied.

Hereinafter, a slice segment header used by the video encoding apparatus 10 and the video decoding apparatus 20 described with reference to FIGS. 1C, 1D, 2C, and 2D will be described below with reference to FIG. 7.

FIG. 7 shows syntax of a slice segment header 70 according to an exemplary embodiment.

The video encoding apparatus 10 of the exemplary embodiment may generate the slice segment header 70 including various pieces of header information about the current slice segment. For example, the slice segment header 70 may include default information required to decode the pictures included in the current slice segment, for example, current PPS identification information, information about the number of pictures included in the current slice segment, information about the number of reference pictures of the pictures, and information whether to use a difference motion vector.

The video encoding apparatus 10 according to the present exemplary embodiment may record information 71 representing whether the current slice segment is an initial slice segment in the current picture, in the slice segment header 70.

The video decoding apparatus 10 of the present exemplary embodiment may add information 75 representing whether the current slice segment is a dependent slice segment to the slice segment header 70, according to whether the information 71 represents that the current slice segment is not the initial slice segment 73. For example, if the information 71 represents that the current slice segment is not the initial slice segment, the information 75 representing whether the current slice segment is the dependent slice segment may be added to the slice segment header 70.

Because the initial slice segment is an independent slice segment according to the exemplary embodiment, if the current slice segment is the initial slice segment, the information representing whether the current slice segment is a dependent slice segment does not need to be transferred. Therefore, the video encoding apparatus 10 does not need to add the information 75 next to the information representing whether the slice segment is the initial slice segment, but adds default information about the current slice segment to the slice segment header 70 and transmits the slice segment header 70.

However, if the current slice segment is not the initial slice segment, but the current slice segment is a dependent slice segment, the video encoding apparatus 10 may transmit the slice segment header 70 after skipping some of the default information about the slice segment.

If the current slice segment is neither the initial slice segment nor the dependent slice segment, that is, if the current slice segment is an independent slice segment, the video encoding apparatus 10 may record the default information about the current slice segment in the slice segment header 70 before transmitting the slice segment header 70.

Processes of parsing the slice segment header 70 by the video decoding apparatus 20 according to the exemplary embodiment are similar to those of generating the slice segment header by the video encoding apparatus 10.

The video decoding apparatus 20 of the present exemplary embodiment may parse the information 71 representing whether the current slice segment is the initial slice segment in the current picture from the slice segment header 70.

The video decoding apparatus 20 determines whether the information 71 represents that the current slice segment is not the initial slice segment 73. Based on the information 71, if it is determined that the current slice segment is the initial slice segment 73, a process of parsing the information 75 representing whether the current slice segment is the dependent slice segment may be skipped, and then, other header information may be further parsed.

However, if it is determined that the current slice segment is not the initial slice segment 73 based on the information 71, the information 75 representing whether the current slice segment is the dependent slice segment may be further parsed from the slice segment header 70.

If it is determined that the current slice segment is not the initial slice segment, but the current slice segment is the dependent slice segment based on the information 71 and the information 75, the video decoding apparatus 20 may parse some of the default information about the current slice segment only from the current slice segment header 70. The video decoding apparatus 20 may determine the information that is not included in the current slice segment header 70 by using the information acquired from the previous slice segment header.

If it is determined that the current slice segment is not the initial slice segment, but the current slice segment is the independent slice segment based on the information 71 and the information 75, the video decoding apparatus 20 may parse all the default information about the current slice segment from the slice segment header 70.

However, the slice segment header 70 shown in FIG. 7 is obtained in a case where the PPS of the current picture includes information representing that the current picture may include dependent slice segments. As described above with reference to FIGS. 1B and 2B, only when the PPS of the current picture including the current slice segment includes information representing that the current picture may include the dependent slice segments, the slice segment header 70 may include the information 75 representing whether the current slice segment is the dependent slice segment.

Therefore, only when the information representing that the current picture may include the dependent slice segments is parsed from the PPS of the current picture and the information 71 parsed from the slice segment header 70 represents that the current slice segment is not the initial slice segment, the information 75 representing whether the current slice segment is the dependent slice segment may be further parsed from the slice segment header 70. Therefore, the video is encoded according to the spatial subdivisions including the slice segments, the tiles, and the slices satisfying the above described conditions, and accordingly, the maximum coding units configuring the tile may be included in the slice segment. Because the maximum coding units included in the current slice segment are decoded according to the scanning order of the maximum coding units in the tile, the current slice segment may be decoded.

Also, in a case of the slice segments included in one tile, after decoding the independent slice segment, the dependent slice segments may be decoded by using the decoding result of the independent slice segment. When the independent slice segment is decoded, the entropy decoding or the in-picture prediction is not performed by referring to the other slice segments that are located beyond the slice segment boundary. Thus, a process of identifying the reference probability of the entropy information, the encoding symbols, and the samples acquired around the slice segment boundary for performing the entropy decoding or the in-picture prediction may be skipped. Therefore, there is no need to include information for identifying the prediction probability between the adjacent blocks at the slice segment boundary in the slice segment header 70.

Because the slice segments included in the current tile are sequentially decoded, the current tile may be decoded. Each of the tiles may be independently decoded from each other. The picture may be reconstructed as a result of combining the reconstructed tiles.

When decoding the tile, the entropy decoding or the in-picture prediction is not performed by referring to other tiles located beyond the tile boundary, and thus, a process of identifying the reference probability of the entropy information, the encoding symbols, and the samples acquired around the tile boundary for performing the entropy decoding or the in-picture prediction may be skipped. Therefore, the slice segment header 70 does not need to include information for identifying the prediction probability between the adjacent blocks at the tile boundary.

Also, information representing whether in-loop filtering is performed on the tile boundary and information representing whether in-loop filtering is performed on the slice segment boundary may be selectively included in the slice segment header 70.

Also, a location or address of the independent slice segment may be identified through the slice segment header of the independent slice segment. An entry point of a tile may be determined at a portion where the location (address) of the independent slice segment and the location (address) of the tile match each other, and thus, there is no need to transmit or parse information about the entry point of the tile.

In the video encoding apparatus 10 and the video decoding apparatus 20, blocks obtained by dividing the video data are the maximum coding units, and each of the maximum coding units is divided into coding units of a tree structure, as described above. Hereinafter, a video encoding apparatus and method and a video decoding apparatus and method based on maximum coding units and coding units of a tree structure will be described below with reference to FIGS. 8 through 20.

Figure 8:
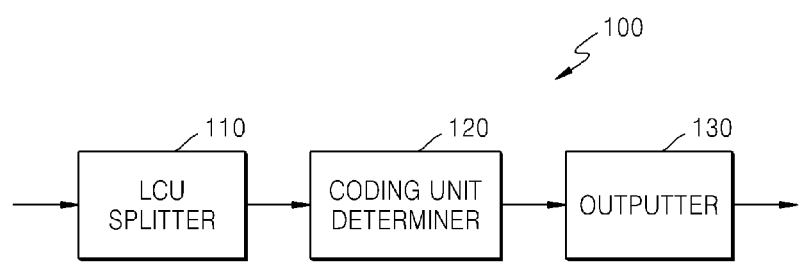
FIG. 8 is a block diagram of a video encoding apparatus based on coding units according to a tree structure, according to an exemplary embodiment.

FIG. 8 is a block diagram of a video encoding apparatus 100 based on coding units of a tree structure, according to an exemplary embodiment.

The video encoding apparatus 100 using video prediction based on coding units according to a tree structure includes a largest coding unit (LCU) splitter 110, a coding unit determiner 120, and an output unit 130. Hereinafter, for convenience of description, the video encoding apparatus 100 using video prediction based on coding units according to a tree structure is referred to as 'the video encoding apparatus 100'.

The LCU splitter 110 may split a current picture based on a maximum coding unit for the current picture of an image. If the current picture is larger than the maximum coding unit, image data of the current picture may be split into at least one maximum coding unit. The maximum coding unit according to an exemplary embodiment may be a data unit having a size of 32×32, 64×64, 128×128, 256×256, etc., wherein a shape of the data unit is a square having a width and length of $2^n$.

A coding unit according to an exemplary embodiment may be characterized by a maximum size and a depth. The depth denotes the number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Because a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Because the maximum coding unit according to an exemplary embodiment is split according to depths, the image data in a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output finally encoded image data according to the at least one split region. In other words, the coding unit determiner 120 determines a coded depth by encoding the image data in the deeper coding units according to depths, according to the maximum coding unit of the current picture, and selecting a depth having the smallest encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the smallest encoding error may be selected after comparing encoding errors of the deeper coding units. At least one coded depth may be selected for each maximum coding unit.

The size of the maximum coding unit is split as a coding unit is hierarchically split according to depths, and the number of coding units increases. Also, even if coding units correspond to the same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split into regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of times splitting is performed from a maximum coding unit to a minimum coding unit. A first maximum depth according to an exemplary embodiment may denote the total number of times splitting is performed from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths lower than the maximum depth, according to the maximum coding unit.

Because the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select, not only a coding unit for encoding the image data, but also a data unit different from the coding unit to perform the prediction encoding on the image data in the coding unit.

In order to perform prediction encoding on the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. The partition is a data unit obtained by dividing the prediction unit of the coding unit, and the prediction unit may be a partition having the same size as the coding unit.

For example, when a 2N×2N coding unit (where N is a positive integer) is no longer split and becomes a 2N×2N prediction unit, a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition having a size of 2N×2N, 2N×N, N×2N, or N×N. Also, the skip mode may be performed only on the 2N×2N partition. The encoding is independently performed on one prediction unit in a coding unit, thereby selecting a prediction mode having the smallest encoding error.

The video encoding apparatus 100 may also perform the transformation on the image data in a coding unit based not only on the coding unit for encoding the image data, but also based on a transformation unit that is different from the coding unit. In order to perform the transformation in the coding unit, the transformation may be performed based on a data unit having a size smaller than or equal to the coding unit. For example, the transformation unit for the transformation may include a transformation unit for an intra mode and a data unit for an inter mode.

Similar to the coding unit according to a tree structure according to the present exemplary embodiment, the transformation unit in the coding unit may be recursively split into smaller size regions and residual data in the coding unit may be divided according to the transformation having a tree structure according to transformation depths.

According to an exemplary embodiment, a transformation depth indicating the number of times splitting is performed to reach the transformation unit by splitting the height and width of the coding unit may also be set in the transformation unit. For example, when the size of a transformation unit of a current coding unit is 2N×2N, a transformation depth may be set to 0. When the size of a transformation unit is N×N, the transformation depth may be set to 1. In addition, when the size of the transformation unit is N/2×N/2, the transformation depth may be set to 2. That is, the transformation unit according to a tree structure may also be set according to the transformation depth.

Encoding information according to coding units corresponding to a coded depth requires not only information about the coded depth, but also about information related to prediction encoding and transformation. Accordingly, the coding unit determiner 120 not only determines a coded depth having the smallest encoding error, but also determines a partition type in a prediction unit, a prediction mode according to prediction units, and a size of a transformation unit for transformation.

Coding units and a prediction unit/partition according to a tree structure in a maximum coding unit, and a method of determining a transformation unit, according to exemplary embodiments, will be described in detail later with reference to FIGS. 10 through 20.

The coding unit determiner 120 may measure an encoding error of deeper coding units according to depths by using Rate-Distortion Optimization based on Lagrange multipliers.

The output unit 130 outputs the image data of the maximum coding unit, which is encoded based on the at least one coded depth determined by the coding unit determiner 120, and information about the encoding mode according to the coded depth, in bit streams.

The encoded image data may be obtained by encoding residual data of an image.

The information about the encoding mode according to the coded depth may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Because at least one coding unit of the lower depth exists in one coding unit of the current depth, the encoding is repeatedly performed on each coding unit of the lower depth, and thus the encoding may be recursively performed for the coding units having the same depth.

Because the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations because the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit having a maximum size, which is included in all of the coding units, prediction units, partition units, and transformation units included in the maximum coding unit.

For example, the encoding information output through the output unit 130 may be classified into encoding information according to coding units and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Also, information about a maximum size of the coding unit defined according to pictures, slices, or GOPs, and information about a maximum depth may be inserted into a header of a bit stream, an SPS or a PPS.

In addition, information about a maximum size of a transformation unit and information about a minimum size of a transformation, which are acceptable for a current video, may also be output via a header of a bit stream, an SPS or a PPS. The output unit 130 may encode and output reference information related to prediction, prediction information, and slice segment type information.

In the video encoding apparatus 100, a deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having a size of 2N×2N may include a maximum value 4 of the coding unit of the lower depth.

Accordingly, the video encoding apparatus 100 may form the coding units having a tree structure by determining coding units having an optimum shape and an optimum size for each maximum coding unit, based on the size of the maximum coding unit and the maximum depth determined considering characteristics of the current picture. Also, because encoding may be performed on each maximum coding unit by using any one of various prediction modes and transformations, an optimum encoding mode may be determined considering characteristics of the coding unit of various image sizes.

Thus, if an image having high resolution or a large amount of data is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus 100, image compression efficiency may be increased because a coding unit is adjusted while considering characteristics of an image while increasing a maximum size of a coding unit while considering a size of the image.

The video encoding apparatus 100 may perform as the video encoding apparatus 10. That is, the coding unit determiner 120 may correspond to the slice segment encoder 12, and the output unit 130 may correspond to the slice segment transmitter 14.

Also, the video encoding apparatus 101 may be applied as the video encoding apparatus 100 according to the present exemplary embodiment. That is, the coding unit determiner 120 may perform operations of the sub-region divider 102 and the sub-region encoder 104.

The coding unit determiner 120 of the exemplary embodiment may independently encode each of the tiles in the picture. Also, the coding unit determiner 120 may encode each of at least one slice segment in the picture. Also, a plurality of maximum coding units included in the current slice segment may be encoded according to the raster scanning order of the maximum coding units in the tile. Accordingly, the coding units having a tree structure may be determined in each of the maximum coding units in each of the slice segments.

Also, a relationship between the slice segment and the tile may satisfy one of the following conditions: (i) the maximum coding units included in one slice segment may be included in the same tile, (ii) the maximum coding units included in one tile may be included in the same slice segment, and (iii) the maximum coding units included in one slice segment may be included in the same tile, and at the same time, the maximum coding units included in one tile may be included in one same slice segment.

For example, if condition (i) is satisfied, the at least one slice segment included in the current tile does not span over the boundary of the current tile. That is, each of the slice segments has to be completely included in the tile.

A relationship between the slice and the tile may satisfy one of the following conditions: (i) the maximum coding units included in one slice may be included in the same tile, (ii) the maximum coding units included in one tile may be included in the same slice, and (iii) the maximum coding units included in one slice may be included in the same tile, and at the same time, the maximum coding units included in one tile may be included in one same slice.

The output unit 130 of the present exemplary embodiment may generate a slice segment header including information representing whether the current slice segment is an initial slice segment in the current picture.

The output unit 130 of the present exemplary embodiment may add information representing whether the current slice segment is a dependent slice segment that uses slice header information of the previous slice segment, if the current slice segment is not the initial slice segment.

The output unit 130 of the present exemplary embodiment may transmit the slice segment header and symbols of the slice segment of each of the slice segments.

Figure 9:
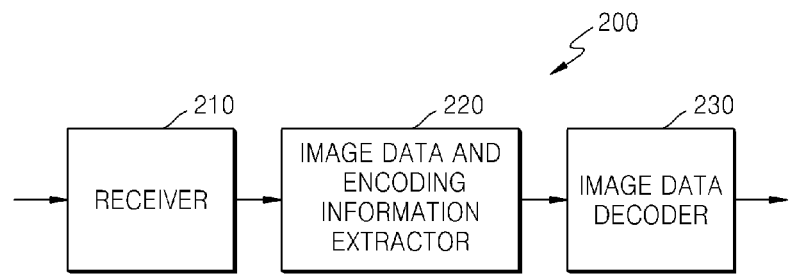
FIG. 9 is a block diagram of a video decoding apparatus based on coding units according to a tree structure, according to an exemplary embodiment.

FIG. 9 is a block diagram of a video decoding apparatus 200 based on coding units according to a tree structure, according to an exemplary embodiment.

The video decoding apparatus 200 based on the coding units according to a tree structure includes a receiver 210, an image data and encoding information extractor 220, and an image data decoder 230. Hereinafter, for convenience of description, the video decoding apparatus 200 using video prediction based on coding units according to a tree structure will be referred to as the 'video decoding apparatus 200'.

Definitions of various terms and expressions, such as a coding unit, a depth, a prediction unit, a transformation unit, and information about various encoding modes, for decoding operations of the video decoding apparatus 200 are identical to those described with reference to FIG. 8 and the video encoding apparatus 100.

The receiver 210 receives and parses a bit stream of an encoded video. The image data and encoding information extractor 220 extracts encoded image data for each coding unit from the parsed bit stream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, an SPS, or a PPS.

Also, the image data and encoding information extractor 220 extracts information about a coded depth and an encoding mode for the coding units having a tree structure according to each maximum coding unit, from the parsed bit stream. The extracted information about the coded depth and the encoding mode is output to the image data decoder 230. In other words, the image data in a bit stream is split into the maximum coding units so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Because encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be determined to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having a tree structure included in each maximum coding unit. A decoding process may include a prediction process including intra prediction and motion compensation, and inverse transformation.

The image data decoder 230 may perform intra prediction or motion compensation according to partitions and a prediction mode of each coding unit, based on the information about the partition type and the prediction mode of the prediction unit of the coding unit according to coded depths.

In addition, the image data decoder 230 may read transformation unit information according to a tree structure for each coding unit to determine transformation units for each coding unit and perform inverse transformation based on transformation units on each coding unit, for inverse transformation of each maximum coding unit. Via the inverse transformation, a pixel value of a spatial region of the coding unit may be restored.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to each coded depth in the current maximum coding unit by using the information about the partition type of the prediction unit, the prediction mode, and the size of the transformation unit.

In other words, data units containing the encoding information including the same split information may be collected by observing the encoding information set assigned for the predetermined data unit from among the coding unit, the prediction unit, and the minimum unit, and the collected data units may be considered to be one data unit to be decoded by the image data decoder 230 in the same encoding mode. For each coding unit determined as described above, information about an encoding mode may be obtained to decode the current coding unit.

The receiver 210 may correspond to the sub-region receiver 102 of the video decoding apparatus 202 described with reference to FIG. 2C. The image data decoder 230 may correspond to the sub-region decoder 204 of the video decoding apparatus 202 described with reference to FIG. 2C.

The receiver 210 may correspond to the slice segment parser 22 of the video decoding apparatus 20 described with reference to FIG. 2C. The image data decoder 230 may correspond to the slice segment decoder 24 of the video decoding apparatus 20 described with reference to FIG. 2C.

The receiver 210 of the present exemplary embodiment may receive a bit stream generated by encoding the picture by the tile and the slice segment units. Also, the bit stream for each of the slice segments may include a slice segment header and encoding symbols of the slice segments.

The receiver 210 may parse information representing whether the current slice segment is an initial slice segment in the current picture from the slice segment header of the current slice segment. When it is determined that the current slice segment is not the initial slice segment from the parsed information, the receiver 210 may further parse information representing whether the current slice segment is a dependent slice segment using the slice header information of the previous slice segment, from the current slice segment header.

When it is determined that the current slice segment is the initial slice segment from the parsed information, the receiver 210 does not parse the information representing whether the current slice segment is a dependent slice segment, from the current slice segment header. If the current slice segment is the initial slice segment, the receiver 210 may parse the information representing whether the current slice segment is the initial slice segment of an initial slice segment header of the picture and default information about the current slice segment from an initial slice segment header of the picture.

When it is determined that the current slice segment is the dependent slice segment from the information parsed from the current slice segment header, the receiver 210 may determine various pieces of header information parsed from the header of the previous slice segment as the default information of the current slice segment.

The image data decoder 230 of the present exemplary embodiment may decode the current slice segment by using the information parsed from the slice segment header and symbols of the current slice segment.

Also, the image data decoder 230 of the present exemplary embodiment may reconstruct the decoded current slice segment, and may reconstruct the picture by combining the reconstructed slice segments.

Also, the image data decoder 230 may reconstruct the picture by combining the slice segments that are decoded for each of the tiles.

The receiver 210 may parse symbols of a plurality of maximum coding units included in the current slice segment according to a scanning order in the tile, with respect to each of the slice segments. Also, the image data decoder 230 of the present exemplary embodiment may decode the maximum coding units according to the raster scanning order by using the parsed symbols of the maximum coding units.

The maximum coding units that are encoded (decoded) according to the scanning order in each of the tiles and in each of the slice segments satisfy one of the following conditions: (i) the maximum coding units included in one slice segment may be included in the same tile; (ii) the maximum coding units included in one tile may be included in the same slice segment; and (iii) the maximum coding units included in one slice segment may be included in the same tile, and the maximum coding units included in one tile may be included in the same slice segment.

For example, if condition (i) is satisfied, the slice segment included in the current tile may be decoded so as not to span over the boundary of the current tile.

The maximum coding units that are encoded (decoded) according to the scanning order in each of the tiles and in each of the slices satisfy one of the following conditions: (i) the maximum coding units included in one slice may be included in the same tile; (ii) the maximum coding units included in one tile may be included in the same slice; and (iii) the maximum coding units included in one slice may be included in the same tile, and the maximum coding units included in one tile may be included in the same slice.

Therefore, the image data decoder 230 of the present exemplary embodiment sequentially decodes the maximum coding units in each of the slice segments to reconstruct the slice segment, and reconstructs the tiles to reconstruct the picture consisting of the tiles.

Also, the image data decoder 230 of the present exemplary embodiment may reconstruct each of the tiles by sequentially decoding the maximum coding units in each of the tiles, and may reconstruct the picture consisting of the reconstructed tiles.

That is, the video decoding apparatus 200 may obtain information about at least one coding unit that generates the minimum encoding error when encoding is recursively performed for each maximum coding unit, and may use the information to decode the current picture. In other words, the coding units, which have a tree structure, determined to be the optimum coding units in each maximum coding unit may be decoded.

Accordingly, even if image data has high resolution and is a large amount of data, the image data may be efficiently decoded and restored by using a size of a coding unit and an encoding mode, which are adaptively determined according to characteristics of the image data, by using information about an optimum encoding mode received from an encoder.

Figure 10:
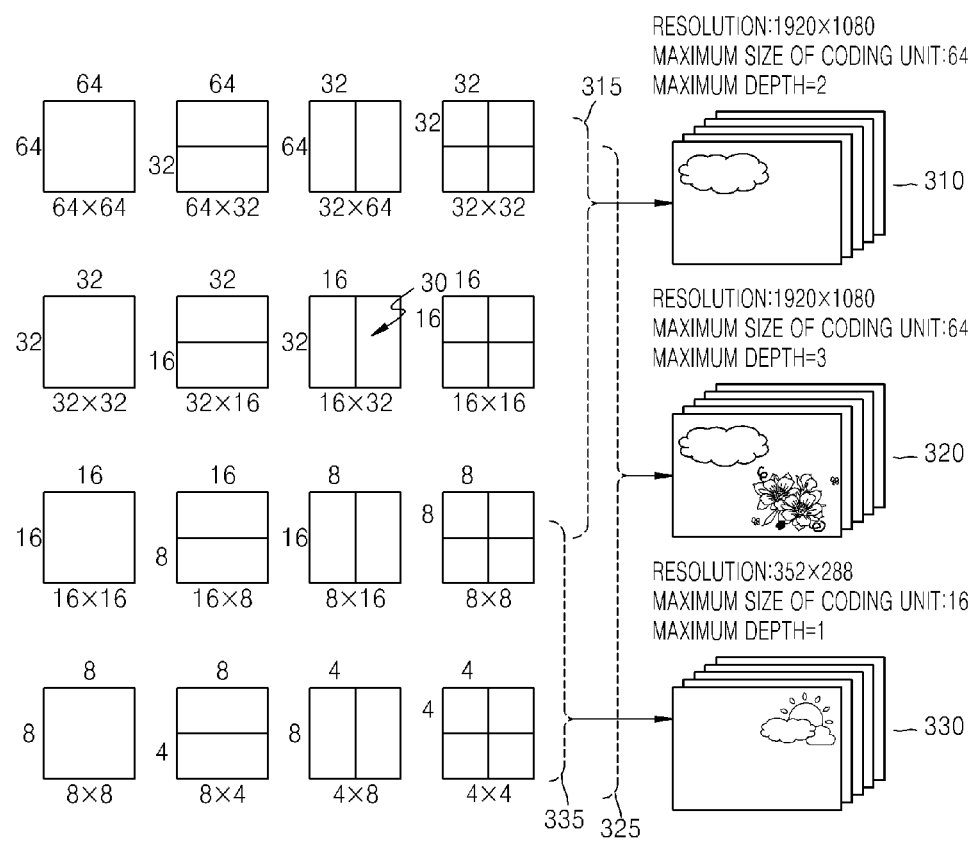
FIG. 10 is a diagram for describing a concept of coding units according to an exemplary embodiment.

FIG. 10 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum coding unit.

If a resolution is high or an amount of data is large, a maximum size of a coding unit may be large to not only increase encoding efficiency but also to accurately reflect characteristics of an image. Accordingly, the maximum size of the coding unit of the video data 310 and 320 having a higher resolution than the video data 330 may be 64.

Because the maximum depth of the video data 310 is 2, coding units 315 of the video data 310 may include maximum coding units having a long axis size of 64 and coding units having long axis sizes of 32 and 16 because depths deepen to two layers by splitting the maximum coding unit twice. Because the maximum depth of the video data 330 is 1, coding units 335 of the video data 330 may include maximum coding units having a long axis size of 16 and coding units having a long axis size of 8 because depths deepen to one layer by splitting the maximum coding unit once.

Because the maximum depth of the video data 320 is 3, coding units 325 of the video data 320 may include a maximum coding unit having a long axis size of 64 and coding units having long axis sizes of 32, 16, and 8 because the depths deepen to 3 layers by splitting the maximum coding unit three times. As a depth deepens, detailed information may be precisely expressed.

Figure 11:
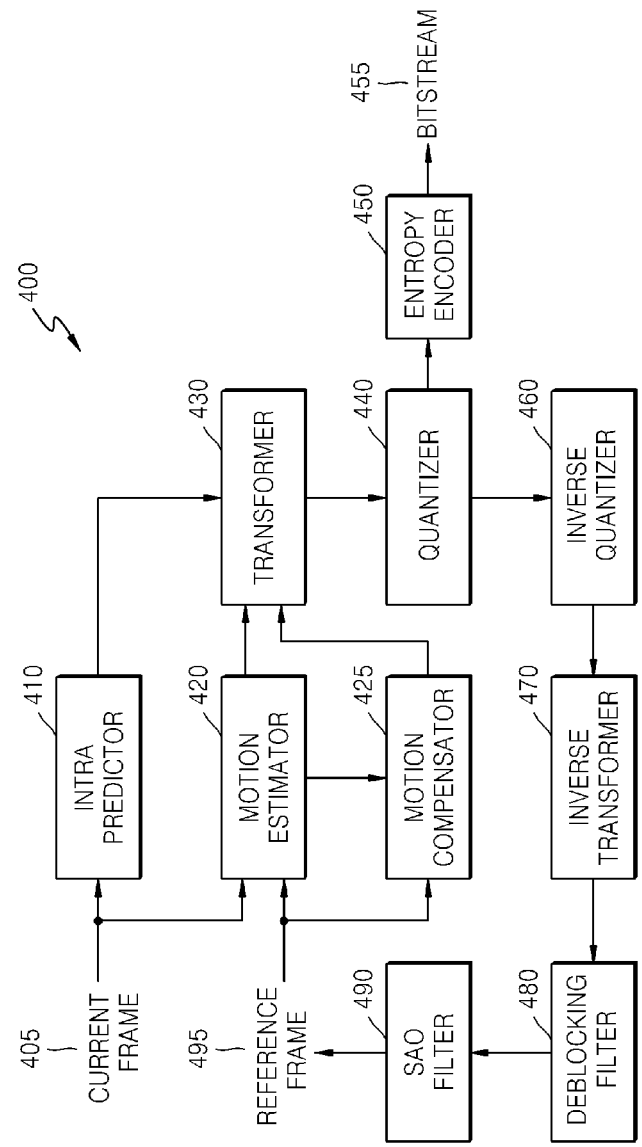
FIG. 11 is a block diagram of an image encoder based on coding units, according to an exemplary embodiment.

FIG. 11 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from a current frame 405, and a motion estimator 420 and a motion compensator 425 perform inter prediction and motion compensation on coding units in an inter mode from the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and an SAO filter 490. The quantized transformation coefficient may be output as a bit stream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the SAO filter 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

The image encoder 400 may perform the encoding operation on each of the maximum coding units, according to the characteristics of the slice segments, the tiles, and the slices described with reference to FIGS. 1A through 7. In particular, the entropy encoder 450 may correspond to the slice segment transmitter 14 according to the exemplary embodiment.

Figure 12:
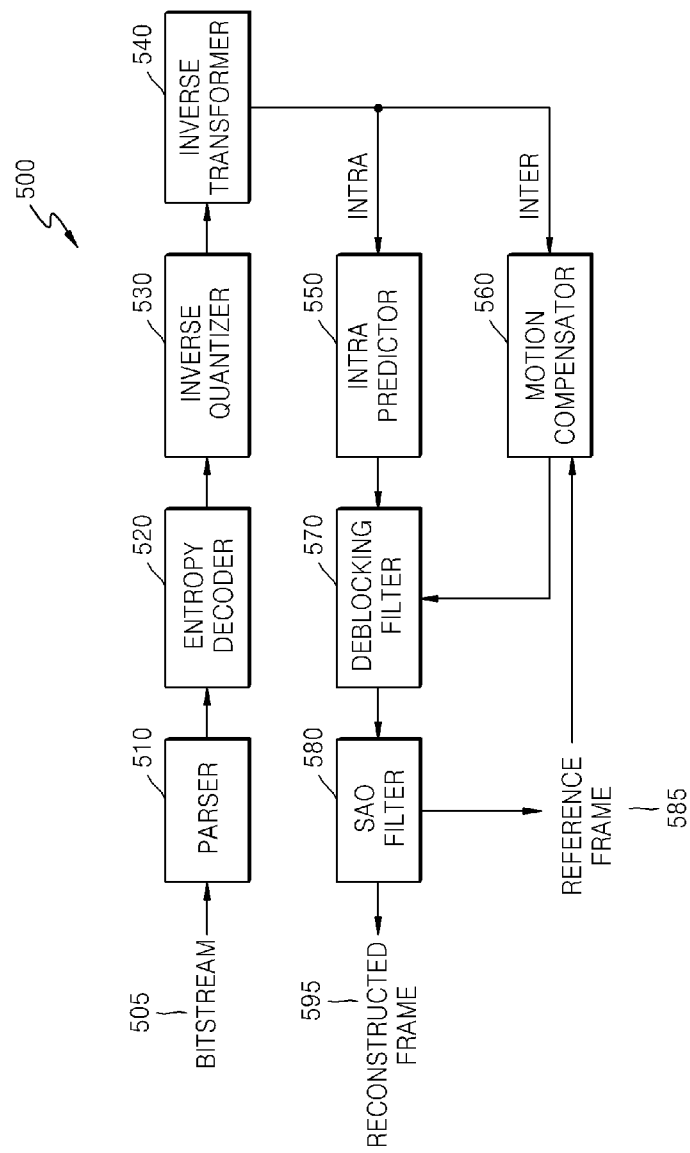
FIG. 12 is a block diagram of an image decoder based on coding units, according to an exemplary embodiment.

FIG. 12 is a block diagram of an image decoder 500 based on coding units, according to an exemplary embodiment.

A parser 510 parses encoded image data to be decoded and information about encoding required for decoding, from a bit stream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and an SAO filter 580. Also, the image data that is post-processed through the deblocking unit 570 and the SAO filter 580 may be output as the reference frame 585.

In order to decode the image data in the image data decoder 230 of the video decoding apparatus 200, the image decoder 500 may perform operations that are performed after the parser 510 performs an operation.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the SAO filter 580, perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 performs operations based on a size of a transformation unit for each coding unit. The image decoder 500 may perform the decoding operation on each of the maximum coding units, according to the characteristics of the slice segments, the tiles, and the slices described with reference to FIGS. 1A through 7. In particular, the entropy decoder 520 may correspond to the slice segment parser 22 according to the exemplary embodiment.

Figure 13:
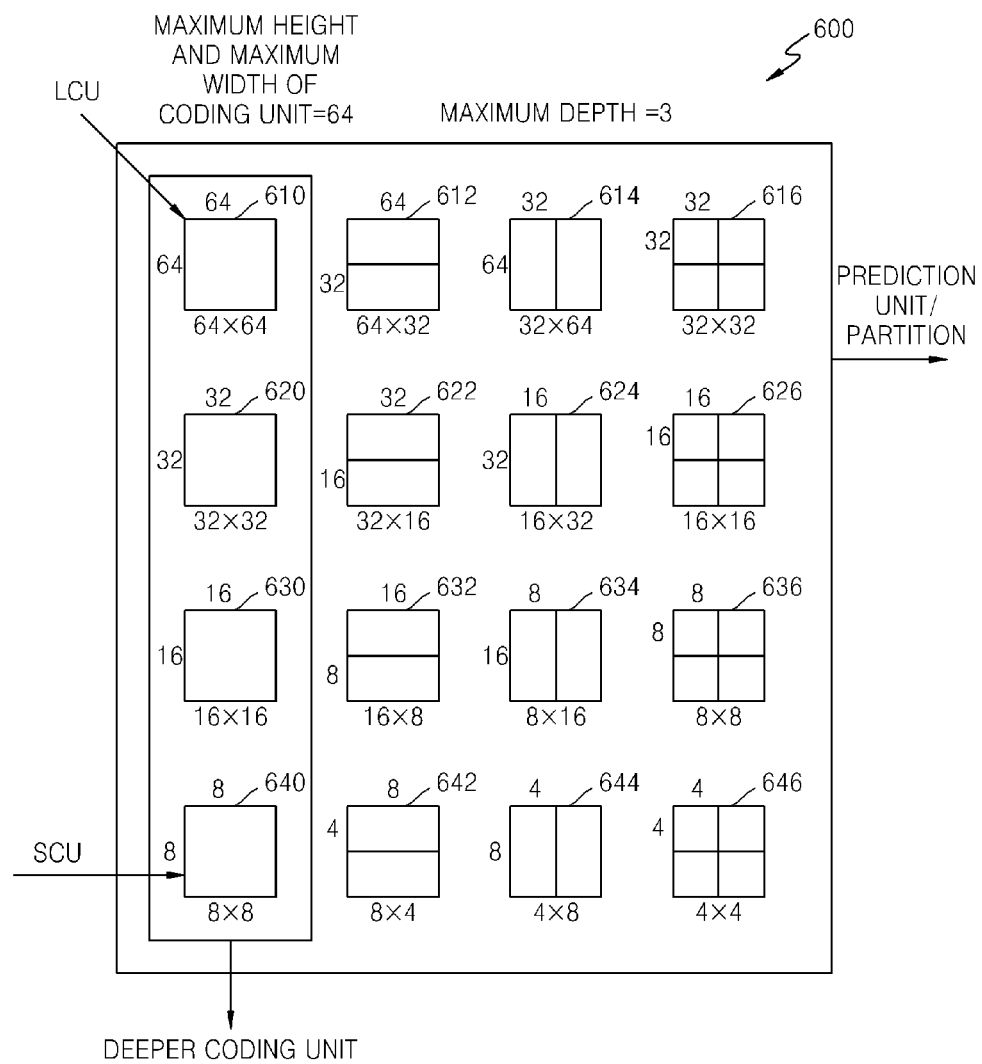
FIG. 13 is a diagram illustrating deeper coding units according to depths, and partitions according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from the maximum coding unit to the minimum coding unit. Because a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis of the hierarchical structure 600, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 4 is a minimum coding unit (smallest coding unit, SCU).

The prediction unit and the partitions of a coding unit are arranged along the horizontal axis according to each depth. In other words, if the coding unit 610 having a size of 64×64 and a depth of 0 is a prediction unit, the prediction unit may be split into partitions included in the coding unit 610, i.e. a partition having a size of 64×64, partitions 612 having a size of 64×32, partitions 614 having a size of 32×64, or partitions 616 having a size of 32×32.

Similarly, a prediction unit of the coding unit 620 having a size of 32×32 and a depth of 1 may be split into partitions included in the coding unit 620, i.e. a partition having a size of 32×32, partitions 622 having a size of 32×16, partitions 624 having a size of 16×32, and partitions 626 having a size of 16×16.

Similarly, a prediction unit of the coding unit 630 having a size of 16×16 and a depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having a size of 8×8 and a depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine the at least one coded depth of the coding units constituting the maximum coding unit 610, the coding unit determiner 120 of the video encoding apparatus 100 performs encoding on coding units corresponding to each depth included in the maximum coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, a coding unit corresponding to a depth of 1 and four coding units corresponding to a depth of 2 are each encoded.

In order to perform encoding for a current depth from among the depths, the least encoding error may be selected for the current depth by performing encoding on each prediction unit in the coding units corresponding to the current depth, along the horizontal axis of the hierarchical structure 600. Alternatively, the minimum encoding error may be searched for by comparing the smallest encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
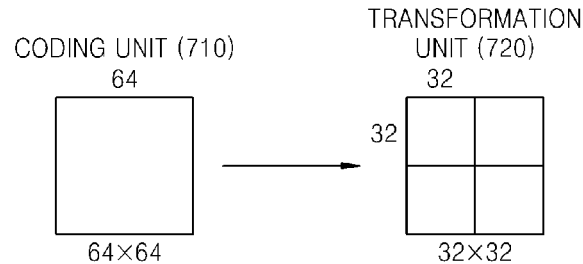
FIG. 14 is a diagram for describing a relationship between a coding unit and transformation units, according to an exemplary embodiment.

FIG. 14 is a diagram for describing a relationship between a coding unit 710 and transformation units 720, according to an exemplary embodiment.

The video encoding apparatus 100 or the video decoding apparatus 200 according to the exemplary embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or the video decoding apparatus 200, if a size of the coding unit 710 is 64×64, transformation may be performed by using the transformation units 720 having a size of 32×32.

Also, data of the coding unit 710 having a size of 64×64 may be encoded by performing the transformation on each of the transformation units having a size of 32×32, 16×16, 8×8, and 4×4, which are smaller than 64×64, and then a transformation unit having the smallest coding error may be selected.

Figure 15:
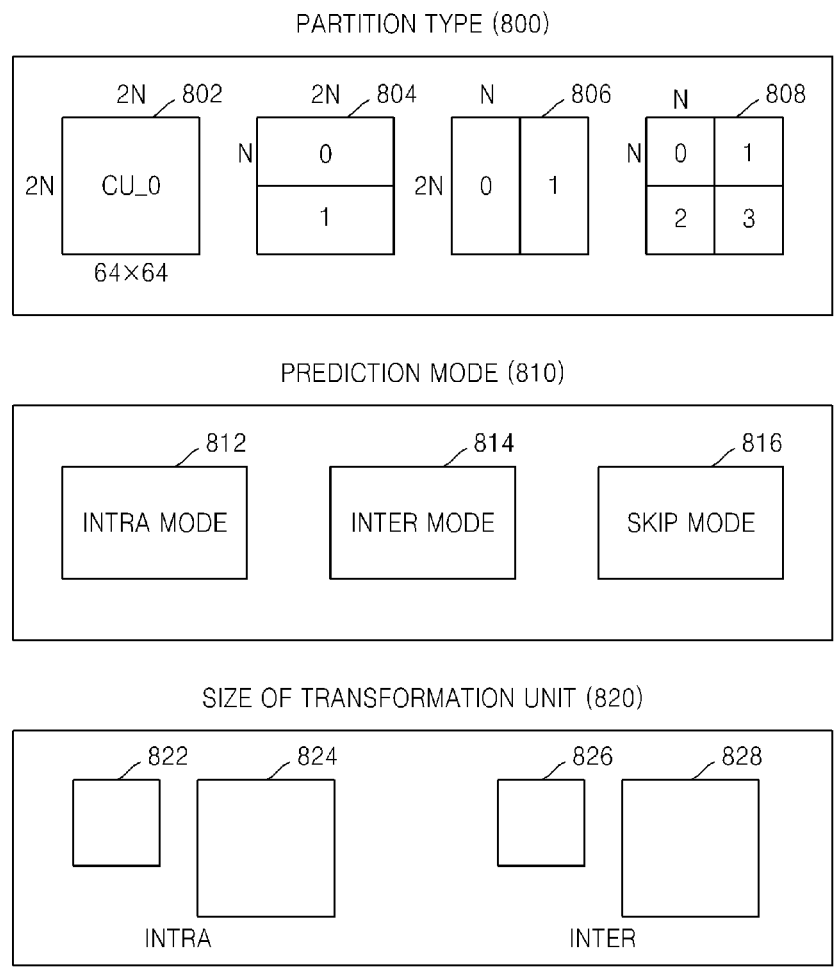
FIG. 15 is a diagram for describing encoding information of coding units corresponding to a coded depth, according to an exemplary embodiment.

FIG. 15 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 210 of the video decoding apparatus 200 may extract and use the information 800, 810, and 820 for decoding, according to each deeper coding unit.

Figure 16:
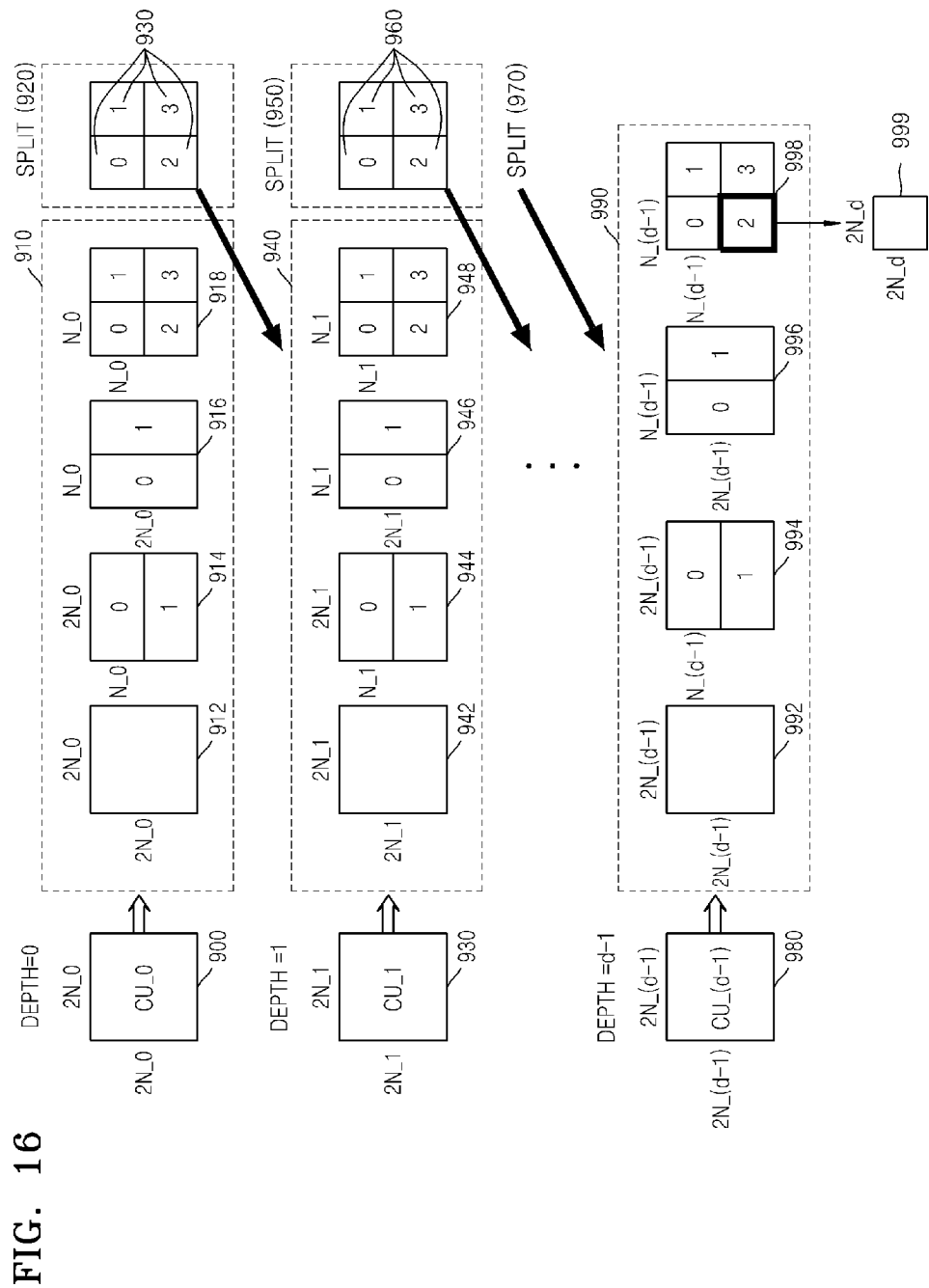
FIG. 16 is a diagram of deeper coding units according to depths, according to an exemplary embodiment.

FIG. 16 is a diagram of deeper coding units according to depths, according to an exemplary embodiment.

Split information may be used to indicate a change of a depth. The split information indicates whether a coding unit of a current depth is split into coding units of a lower depth.

A prediction unit 910 for prediction encoding a coding unit 900 having a depth of 0 and a size of $2N\_0 \times 2N\_0$ may include partitions of a partition type 912 having a size of $2N\_0 \times 2N\_0$, a partition type 914 having a size of $2N\_0 \times N\_0$, a partition type 916 having a size of $N\_0 \times 2N\_0$, and a partition type 918 having a size of $N\_0 \times N\_0$. FIG. 16 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of $2N\_0 \times 2N\_0$, two partitions having a size of $2N\_0 \times N\_0$, two partitions having a size of $N\_0 \times 2N\_0$, and four partitions having a size of $N\_0 \times N\_0$, according to each partition type. The prediction encoding in an intra mode and an inter mode may be performed on the partitions having sizes of $2N\_0 \times 2N\_0$, $N\_0 \times 2N\_0$, $2N\_0 \times N\_0$, and $N\_0 \times N\_0$. The prediction encoding in a skip mode is performed only on the partition having a size of $2N\_0 \times 2N\_0$.

If an encoding error is smallest in one of the partition types 912 through 918 having sizes of $2N\_0 \times 2N\_0$, $N\_0 \times 2N\_0$, $2N\_0 \times N\_0$, and $N\_0 \times N\_0$, the prediction unit 910 may not be split into a lower depth.

If the encoding error is the smallest in the partition type 918 having a size of $N\_0 \times N\_0$, a depth is changed from 0 to 1 to split the partition type 918 in operation 920, and encoding is repeatedly performed on coding units 930 having a depth of 2 and a size of $N\_0 \times N\_0$, to search for a minimum encoding error.

A prediction unit 940 for prediction encoding the coding unit 930 having a depth of 1 and a size of $2N\_1 \times 2N\_1$ ($=N\_0 \times N\_0$) may include partitions of a partition type 942 having a size of $2N\_1 \times 2N\_1$, a partition type 944 having a size of $2N\_1 \times N\_1$, a partition type 946 having a size of $N\_1 \times 2N\_1$, and a partition type 948 having a size of $N\_1 \times N\_1$.

If an encoding error is the smallest in the partition type 948, a depth is changed from 1 to 2 to split the partition type 948 in operation 950, and encoding is repeatedly performed on coding units 960, which have a depth of 2 and a size of $N\_2 \times N\_2$, to search for a minimum encoding error.

When a maximum depth is d, split operation according to each depth may be performed up to when a depth becomes d−1, and split information may be encoded up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of $2N\_(d-1) \times 2N\_(d-1)$ may include partitions of a partition type 992 having a size of $2N\_(d-1) \times 2N\_(d-1)$, a partition type 994 having a size of $2N\_(d-1) \times N\_(d-1)$, a partition type 996 having a size of $N\_(d-1) \times 2N\_(d-1)$, and a partition type 998 having a size of $N\_(d-1) \times N\_(d-1)$.

Prediction encoding may be repeatedly performed on one partition having a size of $2N\_(d-1) \times 2N\_(d-1)$, two partitions having a size of $2N\_(d-1) \times N\_(d-1)$, two partitions having a size of $N\_(d-1) \times 2N\_(d-1)$, four partitions having a size of $N\_(d-1) \times N\_(d-1)$ from among the partition types 992 through 998 to search for a partition type having a minimum encoding error.

Even when the partition type 998 has the minimum encoding error, because a maximum depth is d−1, a coding unit CU_(d−1) having a depth of d−1 is no longer split to a lower depth, and a coded depth for the coding units constituting the current maximum coding unit 900 is determined to be d−1 and a partition type may be determined to be $N\_(d-1) \times N\_(d-1)$. Also, because the maximum depth is d−1, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 0 through d, and a depth having the least encoding error may be determined as a coded depth. The coded depth, the partition type of the prediction unit, and the prediction mode may be encoded and transmitted as information about an encoding mode. Also, because a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 17:
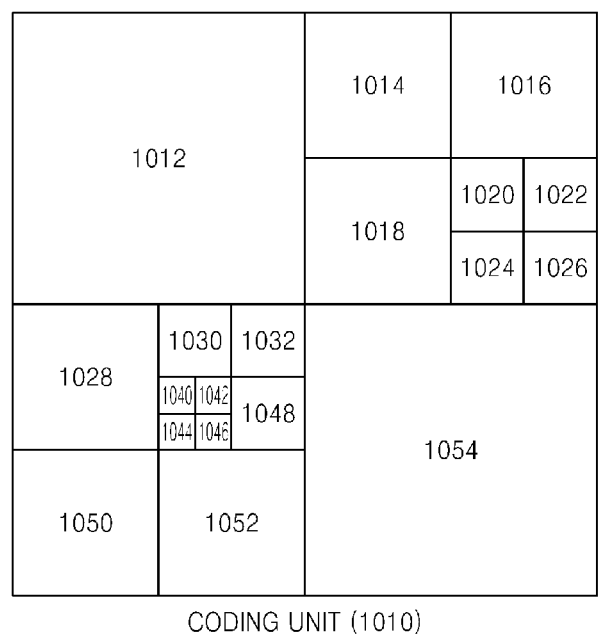
FIGS. 17 through 19 are diagrams for describing a relationship between coding units, prediction units, and transformation units, according to an exemplary embodiment.
Figure 18:
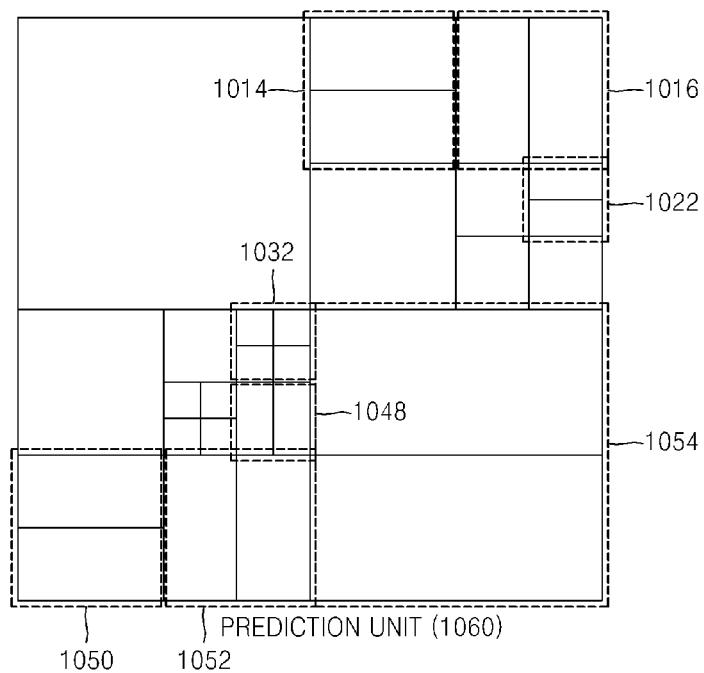
Figure 19:
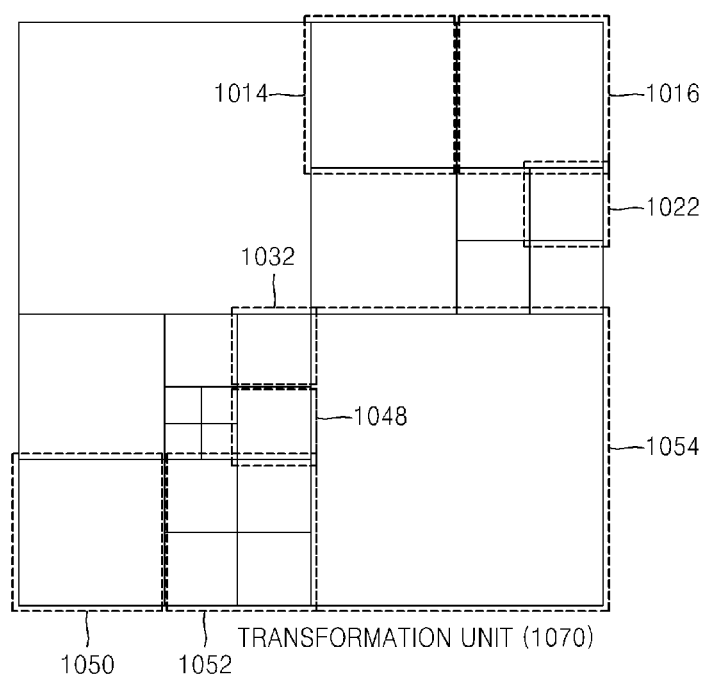

FIGS. 17 through 19 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1070 are different from those in the prediction units 1060 in terms of sizes and shapes. In other words, the video encoding and decoding apparatuses 100 and 200 may perform intra prediction, motion prediction, motion compensation, transformation, and inverse transformation individually on a data unit in the same coding unit.

Accordingly, encoding is recursively performed on each of the coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bit stream.

Split information indicates whether a current coding unit is split into coding units of a lower depth. If split information of a current depth d is 0, a depth, in which a current coding unit is no longer split into a lower depth, is a coded depth, and thus information about a partition type, a prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having sizes of 2N×nU and 2N×nD may be respectively obtained by splitting the height of the prediction unit in 1:3 and 3:1, and the asymmetrical partition types having sizes of nL×2N and nR×2N may be respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having a size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched for using encoded information of the data units, and the adjacent coding units may be referred to for predicting the current coding unit.

Figure 20:
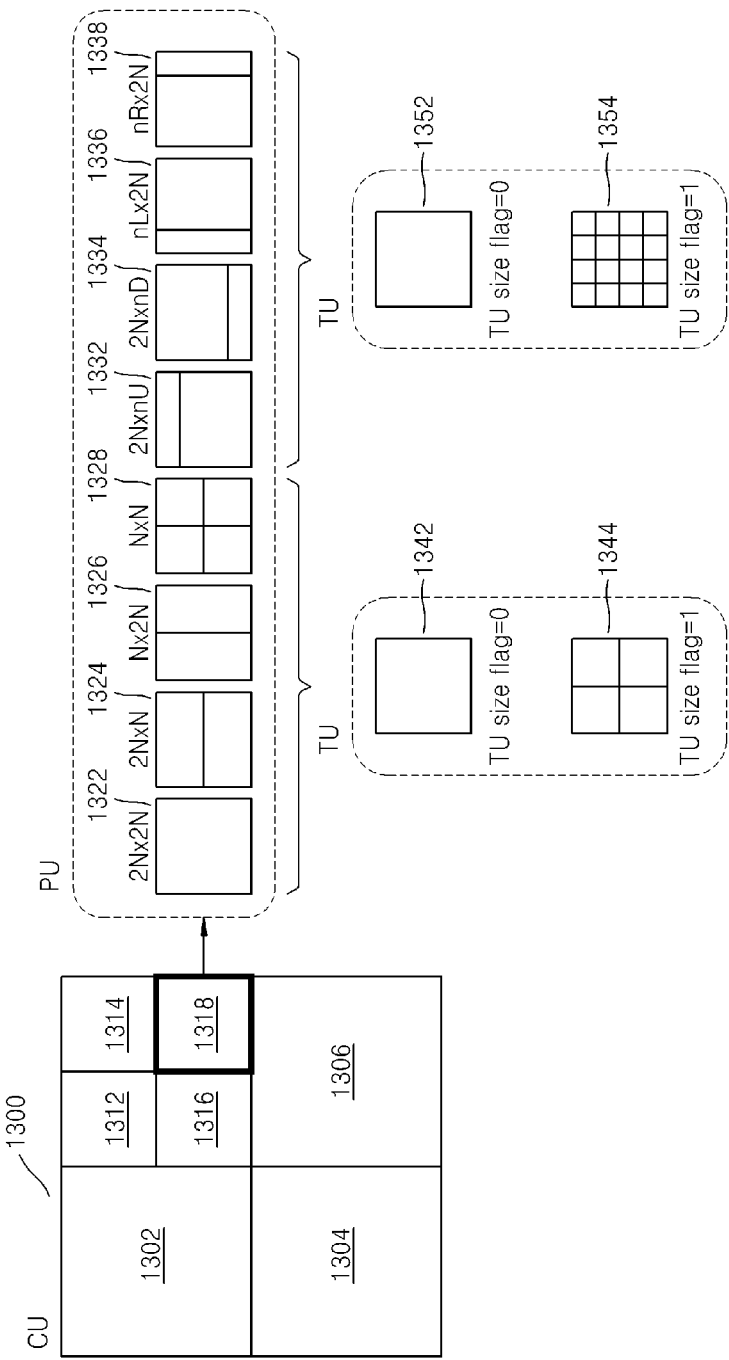
FIG. 20 is a diagram for describing a relationship between a coding unit, a prediction unit or a partition, and a transformation unit, according to encoding mode information.

FIG. 20 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, because the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information, for example a transformation unit (TU) size flag, of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value of 0 or 1, but the TU size flag is not limited to 1 bit, and a transformation unit may be hierarchically split having a tree structure while the TU size flag increases from 0. Split information (TU size flag) of a transformation unit may be an example of a transformation index.

In this case, the size of a transformation unit that has been actually used may be expressed by using a TU size flag of a transformation unit, according to an exemplary embodiment, together with a maximum size and a minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, because the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size and 'PUSize' denotes a current prediction unit size.

$$RootTuSize=\min(MaxTransformSize, PUSize) \quad (2)$$

That is, if the current prediction mode is an inter mode, the transformation unit size 'RootTuSize', when the TU size flag is 0, may be a smaller value of the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is an intra mode, the transformation unit size 'RootTuSize' when the TU size flag is 0 may be a smaller value of the maximum transformation unit size and the size of the current partition unit.

However, the current maximum transformation unit size 'RootTuSize' that varies according to the type of a prediction mode in a partition unit is just an example and is not limited thereto.

According to the video encoding method based on coding units having a tree structure, as described with reference to FIGS. 8 through 20, image data of a spatial region is encoded for each coding unit of a tree structure. According to the video decoding method based on coding units having a tree structure, decoding is performed for each maximum coding unit to restore image data of a spatial region. Thus, a picture and a video that is a picture sequence may be restored. The restored video may be reproduced by a reproducing apparatus, stored in a storage medium, or transmitted through a network.

The exemplary embodiments may be written as computer programs and may be implemented in general-use digital computers that execute the programs using a computer-readable recording medium. Examples of the computer-readable recording medium include magnetic storage media (e.g., ROM, floppy disks, hard disks, etc.) and optical recording media (e.g., CD-ROMs or DVDs).

For convenience of description, a video encoding method, including the entropy encoding method described with reference to FIGS. 1A through 20, will be collectively referred to as a 'video encoding method according to the present invention'. In addition, the video decoding method, including the entropy decoding method described with reference to FIGS. 1A through 20, will be referred to as a 'video decoding method according to the present invention'.

A video encoding apparatus, including the video encoding apparatus 10, the video encoding apparatus 101, the video encoding apparatus 100, or the image encoder 400 described with reference to FIGS. 1A through 20, will be referred to as a 'video encoding apparatus'. In addition, a video decoding apparatus, including the video decoding apparatus 20, the video decoding apparatus 201, the video decoding apparatus 200, or the image decoder 500 described with reference to FIGS. 1A through 20, will be referred to as a 'video decoding apparatus'.

A computer-readable recording medium storing a program, e.g., a disc 26000, according to an exemplary embodiment will now be described in detail.

Figure 21:
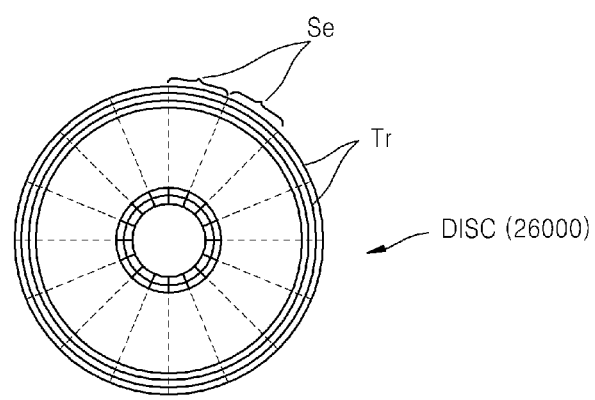
FIG. 21 illustrates a physical structure of a disc that stores a program, according to an exemplary embodiment.

FIG. 21 illustrates a physical structure of a disc 26000 that stores a program, according to an exemplary embodiment. The disc 26000, which is a storage medium, may be a hard drive disc, a CD-ROM disc, a Blu-ray disc, or a DVD. The disc 26000 includes a plurality of concentric tracks Tr that are each divided into a specific number of sectors Se in a circumferential direction of the disc 26000. In a specific region of the disc 26000, a program that executes a method of predicting multi-view video, a method of prediction restoring multi-view video, a method of encoding multi-view video, and a method of decoding multi-view video as described above may be assigned and stored.

A computer system embodied using a storage medium that stores a program for executing a video encoding method and a video decoding method as described above will now be described with reference to FIG. 22.

Figure 22:
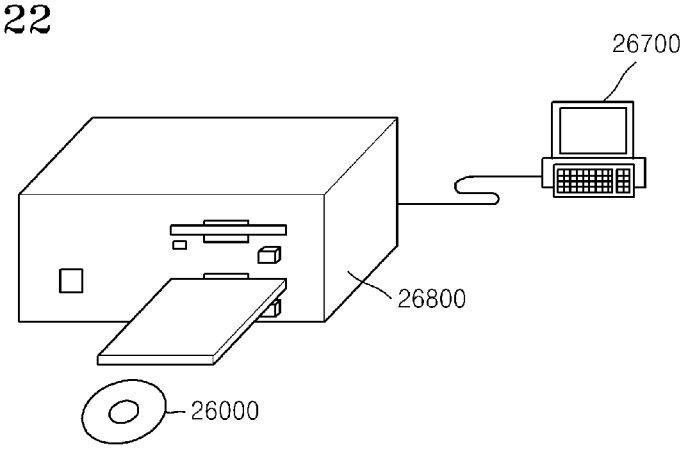
FIG. 22 illustrates a disc drive that records and reads a program by using a disc.

FIG. 22 illustrates a disc drive 26800 that records and reads a program by using a disc 26000. A computer system 26700 may store a program that executes at least one of a video encoding method and a video decoding method according to an exemplary embodiment, in the disc 26000 via the disc drive 26800. To run the program stored in the disc 26000 by the computer system 26700, the program may be read from the disc 26000 and be transmitted to the computer system 26700 by using the disc drive 26800.

The program that executes at least one of a video encoding method and a video decoding method according to an exemplary embodiment may be stored not only in the disc 260 illustrated in FIG. 21 or 22 but also in a memory card, a ROM cassette, or a solid state drive (SSD).

A system to which the video encoding method and a video decoding method described above are applied will be described below.

Figure 23:
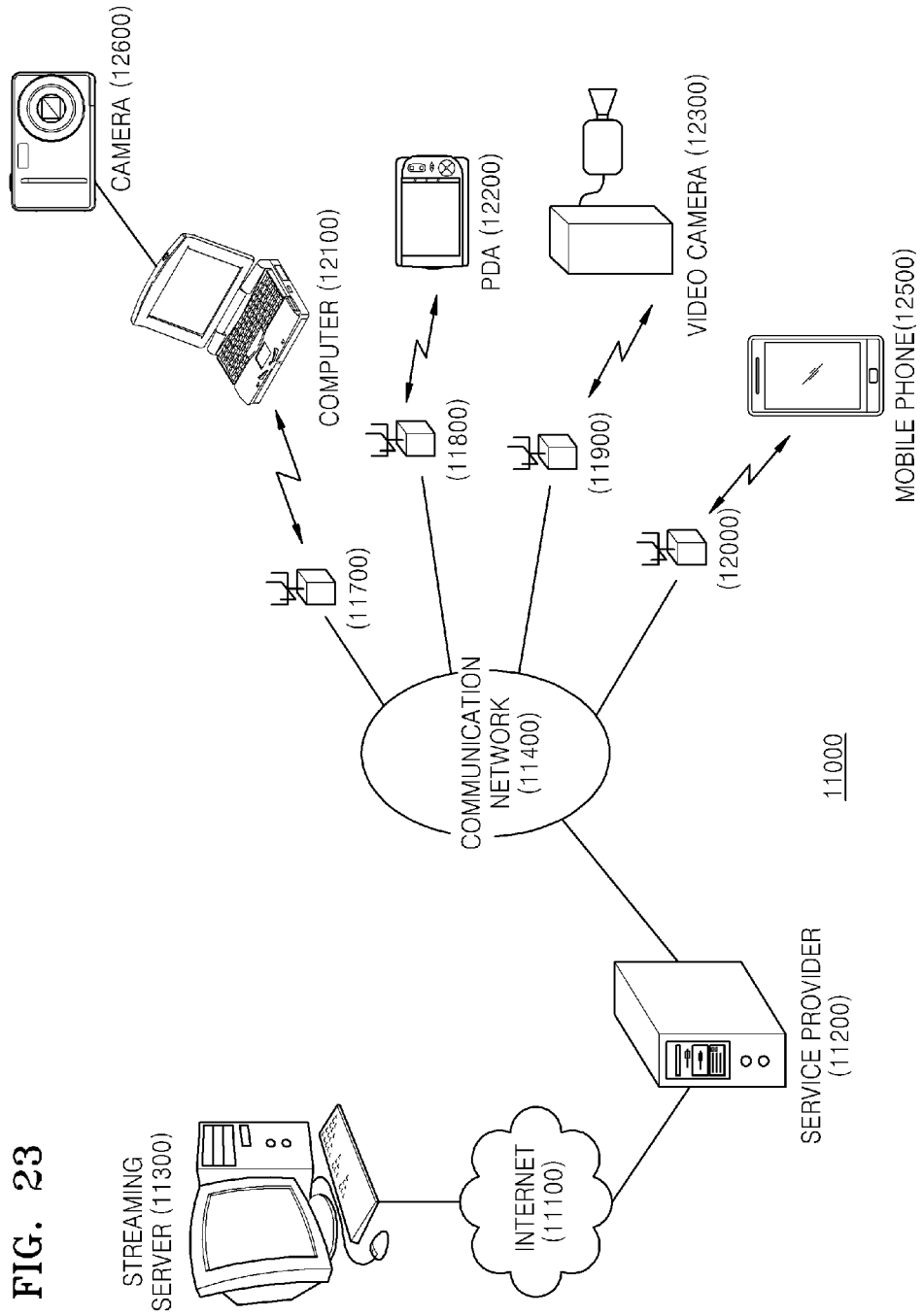
FIG. 23 illustrates an entire structure of a content supply system that provides a content distribution service.

FIG. 23 illustrates an entire structure of a content supply system 11000 that provides a content distribution service. A service area of a communication system is divided into predetermined-sized cells, and wireless default stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an Internet service provider 11200, a communication network 11400, and the wireless default stations 11700, 11800, 11900, and 12000.

Figure 24:
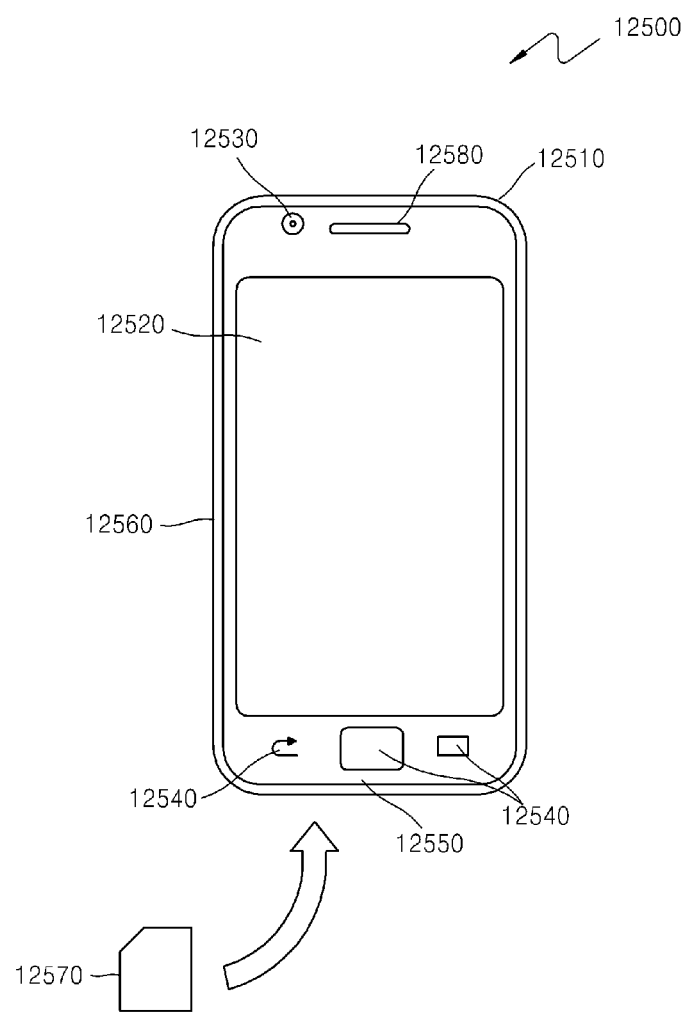
FIGS. 24 and 25 illustrate external and internal structures of a mobile phone to which a video encoding method and a video decoding method are applied, according to an exemplary embodiment.

However, the content supply system 11000 is not limited to illustration in FIG. 24, and devices may be selectively connected thereto. The plurality of independent devices may be directly connected to the communication network 11400, not via the wireless default stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless default station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by the video camera 12300 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding on video may be stored in a computer-readable recording medium, e.g., a CD-ROM disc, a floppy disc, a hard drive disc, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

According to an exemplary embodiment, the content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

FIG. 24 illustrates an external structure of the mobile phone 12500 to which a video encoding method and a video decoding method are applied, according to an exemplary embodiment. The mobile phone 12500 may be a smartphone, the functions of which are not limited and a large part of the functions of which may be changed or expanded.

The mobile phone 12500 includes an internal antenna 12510 via which a radio-frequency (RF) signal may be exchanged with the wireless default station 12000 of FIG. 24, and includes a display screen 12520 for displaying images captured by a camera 12530 or images that are received via the antenna 12510 and decoded, e.g., a liquid crystal display (LCD) or an organic light-emitting diode (OLED) screen. The smartphone 12500 includes an operation panel 12540 including a control button and a touch panel. If the display screen 12520 is a touch screen, the operation panel 12540 further includes a touch sensing panel of the display screen 12520. The smartphone 12510 includes a speaker 12580 for outputting voice and sound or another type sound output unit, and a microphone 12550 for inputting voice and sound or another type sound input unit. The smartphone 12510 further includes the camera 12530, such as a charge-coupled device (CCD) camera, to capture video and still images. The smartphone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

Figure 25:
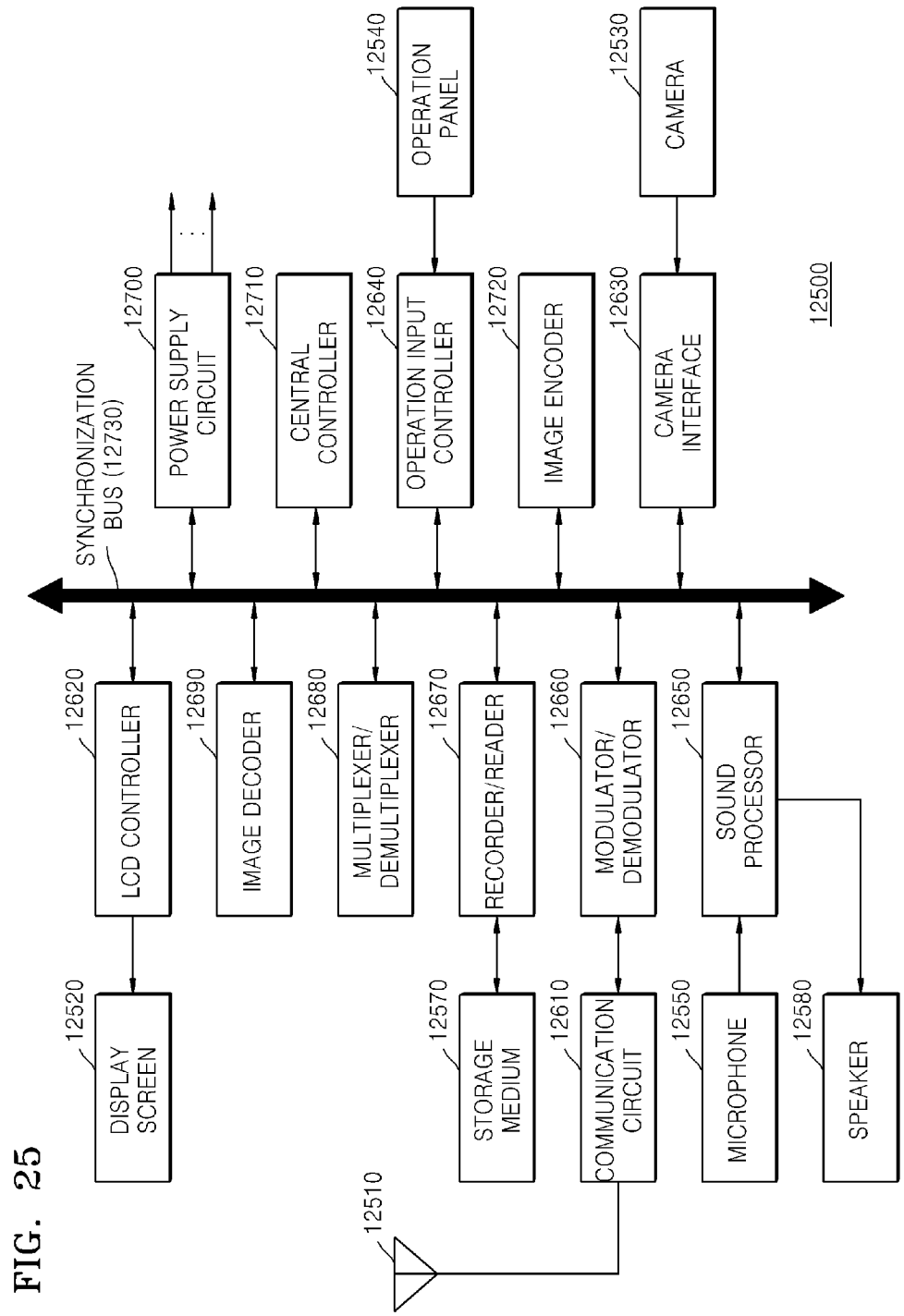

FIG. 25 illustrates an internal structure of the mobile phone 12500, according to an exemplary embodiment. To systemically control parts of the mobile phone 12500, including the display screen 12520 and the operation panel 12540, a power supply circuit 12700, an operation input controller 12640, an image encoding unit 12720, a camera interface 12630, an LCD controller 12620, an image decoding unit 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), ROM, and random access memory (RAM).

While the mobile phone 12500 transmits communication data to the outside, a digital signal is generated in the mobile phone 12500 under control of the central controller 12710. For example, the sound processor 12650 may generate a digital sound signal, the image encoding unit 12720 may generate a digital image signal, and text data of a message may be generated via the operation panel 12540 and the operation input controller 12640. When a digital signal is transmitted to the modulation/demodulation unit 12660 under control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication default station or the wireless default station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulation/demodulation unit 12660 and the communication circuit 12610, and may be transmitted via the antenna 12510.

When a text message, e.g., email, is transmitted in a data communication mode, text data of the text message is input via the operation panel 12540 and is transmitted to the central controller 12610 via the operation input controller 12640. Under control of the central controller 12610, the text data is transformed into a transmission signal via the modulation/demodulation unit 12660 and the communication circuit 12610 and is transmitted to the wireless default station 12000 via the antenna 12510.

To transmit image data in the data communication mode, image data captured by the camera 12530 is provided to the image encoding unit 12720 via the camera interface 12630.

The captured image data may be directly displayed on the display screen 12520 via the camera interface 12630 and the LCD controller 12620.

A structure of the image encoding unit 12720 may correspond to that of the video encoding apparatus 100 described above. The image encoding unit 12720 may transform the image data received from the camera 12530 into compressed and encoded image data according to a video encoding method employed by the video encoding apparatus 100 or the image encoder 400 described above, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be delivered to the multiplexer/demultiplexer 12680.

The multiplexer/demultiplexer 12680 multiplexes the encoded image data received from the image encoding unit 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency transformation and ADC are performed on a signal received via the antenna 12510 to transform the signal into a digital signal. The modulation/demodulation unit 12660 modulates a frequency band of the digital signal. The frequency-band modulated digital signal is transmitted to the video decoding unit 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, under control of the central controller 12710.

When in the data communication mode, data of a video file accessed at an Internet website is received, a signal received from the wireless default station 12000 via the antenna 12510 is output as multiplexed data via the modulation/demodulation unit 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoding unit 12690 and the sound processor 12650, respectively.

A structure of the image decoding unit 12690 may correspond to that of the video decoding apparatus 200 described above. The image decoding unit 12690 may decode the encoded video data to obtain restored video data and provide the restored video data to the display screen 12520 via the LCD controller 12620, according to a video decoding method employed by the video decoding apparatus 200 or the image decoder 500 described above.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 26:
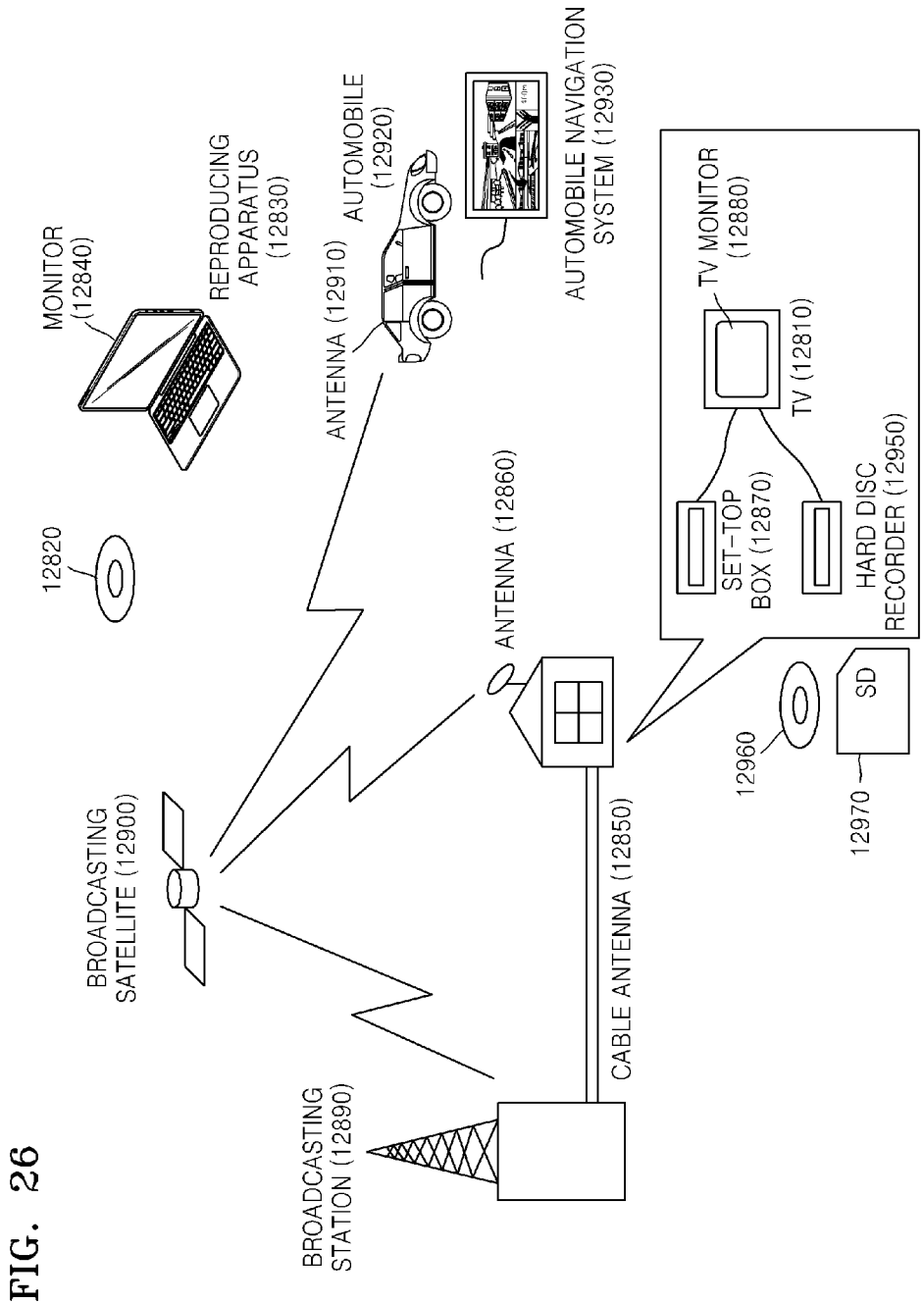
FIG. 26 illustrates a digital broadcasting system employing a communication system, according to an exemplary embodiment.

A communication system according to the exemplary embodiment is not limited to the communication system described above with reference to FIG. 24. For example, FIG. 26 illustrates a digital broadcasting system employing a communication system, according to an exemplary embodiment. The digital broadcasting system of FIG. 26 may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to restore digital signals. Thus, the restored video signal may be reproduced, for example, on a monitor 12840.

In the set-top box 12870 connected to the antenna 12860 for a satellite/terrestrial broadcast or a cable antenna 12850 for receiving a cable TV broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920, including an appropriate antenna 12910, may receive a signal transmitted from the satellite 12900 or the wireless default station 11700. A decoded video may be reproduced on a display screen of an automobile navigation system 12930 built in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoding unit 12720 of FIG. 26. For example, the computer 12100 and the TV receiver 12810 may not be included in the camera 12530, the camera interface 12630, and the image encoding unit 12720 of FIG. 26.

Figure 27:
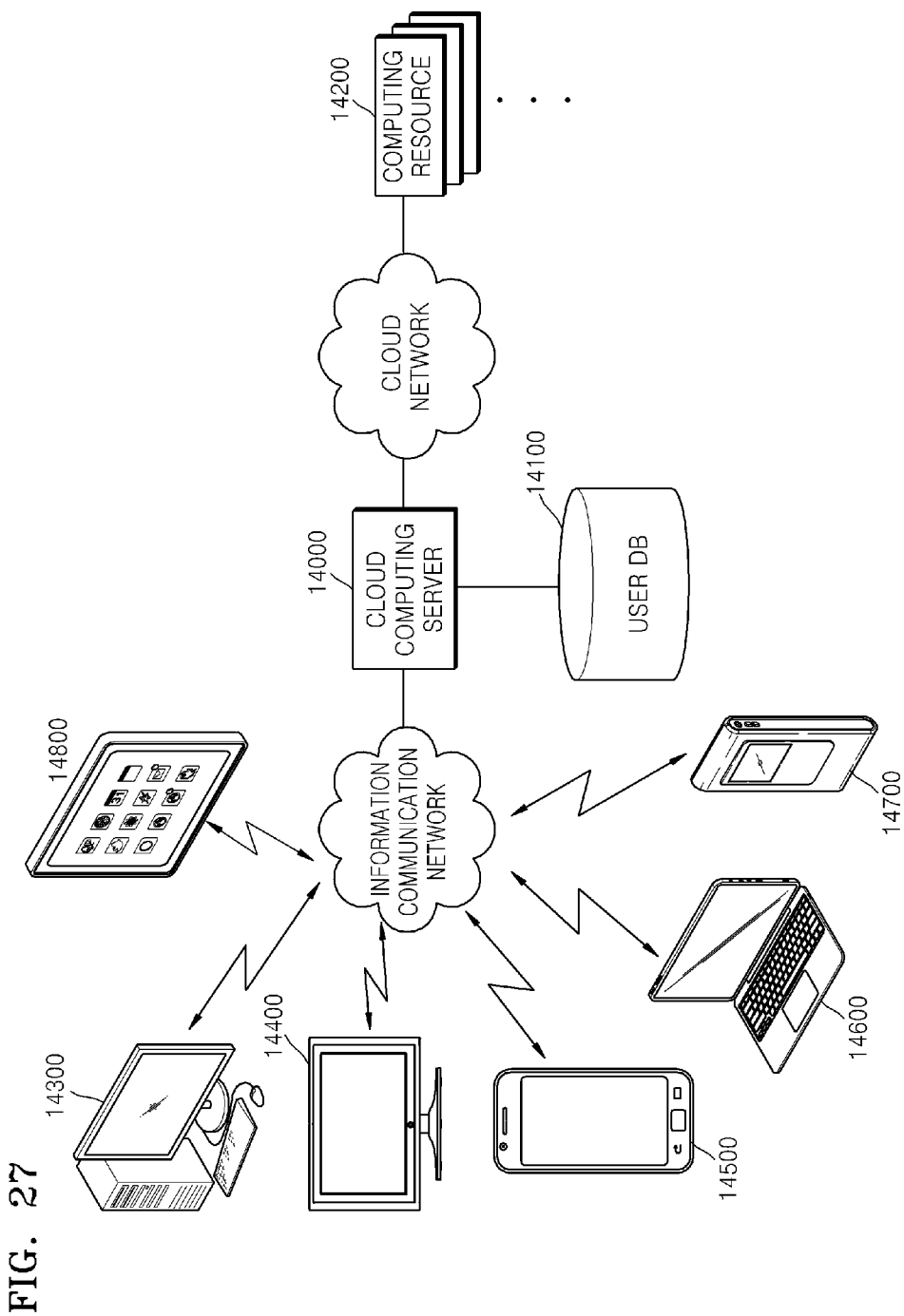
FIG. 27 illustrates a network structure of a cloud computing system using a video encoding apparatus and a video decoding apparatus, according to an exemplary embodiment.

FIG. 27 illustrates a network structure of a cloud computing system using a video encoding apparatus and a video decoding apparatus, according to an exemplary embodiment.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point of time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smartphone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of the combining. The plurality of computing resources 14200 may include various data services, and may include data uploaded from user terminals. As described above, the cloud computing server 14000 may provide user terminals with desired services by combining video data default distributed in different regions according to the virtualization technology.

User information about users who have subscribed to a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smartphone 14500, the cloud computing server 14000 searches for and reproduces this video service, based on the user DB 14100. When the smartphone 14500 receives a video data stream from the cloud computing server 14000, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14100 receives a request to reproduce a video stored in the user DB 14100, from a user terminal. If this video was being reproduced, then a method of streaming this video, performed by the cloud computing server 14000 may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include a video decoding apparatus as described above with reference to FIGS. 1A to 20. As another example, the user terminal may include a video encoding apparatus as described above with reference to FIGS. 1A to 20. Alternatively, the user terminal may include both the video decoding apparatus and the video encoding apparatus as described above with reference to FIGS. 1A to 20.

Various applications of a video encoding method, a video decoding method, a video encoding apparatus, and a video decoding apparatus according to exemplary embodiments described above with reference to FIGS. 1A to 20 have been described above with reference to FIGS. 21 to 27. However, methods of storing the video encoding method and the video decoding method in a storage medium or methods of implementing the video encoding apparatus and the video decoding apparatus in a device according to various exemplary embodiments are not limited to the exemplary embodiments described above with reference to FIGS. 21 to 27.

While the exemplary embodiments have been particularly shown and described, it will be understood by those of ordinary skill in the art that various changes in form and details may be made therein without departing from the spirit and scope the present application as defined by the following claims.

What is claimed is:

1. A method for decoding a video, the method comprising:
obtaining, from a bitstream, information about a location of a column boundary of the tile;
determining tiles, including a current tile, based on the information about the location of the column boundary of the tile; and
obtaining, based on split information of a coding unit, at least one coding unit from a maximum coding unit included in both the current tile and a current slice segment,
wherein all maximum coding units in the current slice segment are included in the current tile, and
when the split information indicate a split at a current depth, a coding unit of the current depth is split into coding units of a lower depth.

2. The method of claim 1, wherein the maximum coding unit is hierarchically split into at least one coding unit of a depth according to the split information, the depth including at least one of a current depth and a lower depth,
when the split information indicates a split at the current depth, the coding unit of the current depth is split into four square coding units of a lower depth independently from neighboring coding units, and
when the split information indicates a non-split at the current depth, at least one prediction unit is obtained from the coding unit of the current depth and at least one transformation unit is obtained from the coding unit of the current depth.

3. The method of claim 1, wherein the slice segment includes at least one maximum coding unit according to a raster scan order, the slice segment is contained in a single NAL (Network Adaptation Layer) unit, and the slice segment does not exceed a boundary of the current tile.

4. The method of claim 1, wherein first information is obtained from the bitstream, the first information indicating whether the current slice segment is an initial slice segment in a picture;

when the first information indicates that the current slice segment is not the initial slice segment, second information is obtained from the bitstream, the second information indicating whether the current slice segment is a dependent slice segment;

when the second information indicates that the current slice segment is the dependent slice segment, header information of the current slice segment is obtained based on header information of other slice segment.

when the second information indicates that the current slice segment is an independent slice segment, the header information of the current slice segment is obtained from the bitstream.

* * * * *